United States Patent

Cosatto et al.

[11] Patent Number: 6,118,887
[45] Date of Patent: *Sep. 12, 2000

[54] ROBUST MULTI-MODAL METHOD FOR RECOGNIZING OBJECTS

[75] Inventors: Eric Cosatto, Highlands; Hans Peter Graf, Lincroft; Gerasimos Potamianos, Chatham, all of N.J.

[73] Assignee: AT&T Corp., New York, N.Y.

[*] Notice: This patent is subject to a terminal disclaimer.

[21] Appl. No.: 08/948,750

[22] Filed: Oct. 10, 1997

[51] Int. Cl.[7] .................................................. G06K 9/00
[52] U.S. Cl. ........................................... 382/103; 382/107
[58] Field of Search .................................... 382/277, 230, 382/304, 118, 103, 107, 218, 173; 348/169

[56] References Cited

U.S. PATENT DOCUMENTS

| | | | |
|---|---|---|---|
| 5,706,365 | 1/1998 | Rangarajan et al. | 382/230 |
| 5,864,630 | 1/1999 | Cosatto et al. | 382/103 |
| 5,867,584 | 2/1999 | Hu et al. | 348/169 |

OTHER PUBLICATIONS

Etoh, M. et al "Segmentation & 2D Motion Estimation by Region Fragments", Computer Vision Proceedings, 4th International Conference pp. 192–199, 1993.

Schuster, R. "Color Object Tracking With Adaptive Mdeling", Visual Behaviors. Proceedings of the Workshop, pp. 91–96, 1994.

*Primary Examiner*—Amelia Au
*Assistant Examiner*—Samir Ahmed

[57] ABSTRACT

A method for tracking heads and faces is disclosed wherein a variety of different representation models can be used to define individual heads and facial features in a multi-channel capable tracking algorithm. The representation models generated by the channels during a sequence of frames are ultimately combined into a representation comprising a highly robust and accurate tracked output. In a preferred embodiment, the method conducts an initial overview procedure to establish the optimal tracking strategy to be used in light of the particular characteristics of the tracking application.

22 Claims, 18 Drawing Sheets

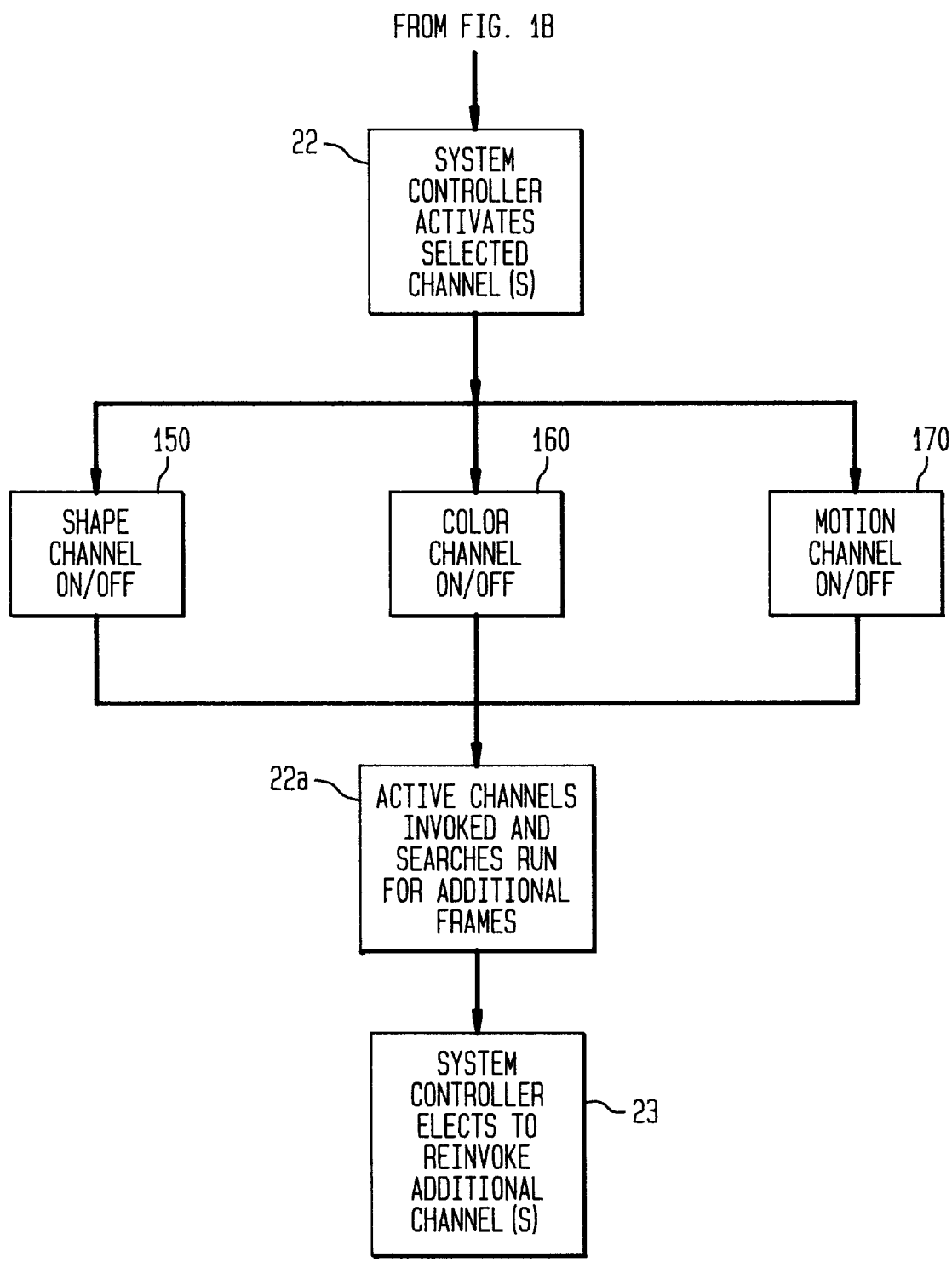

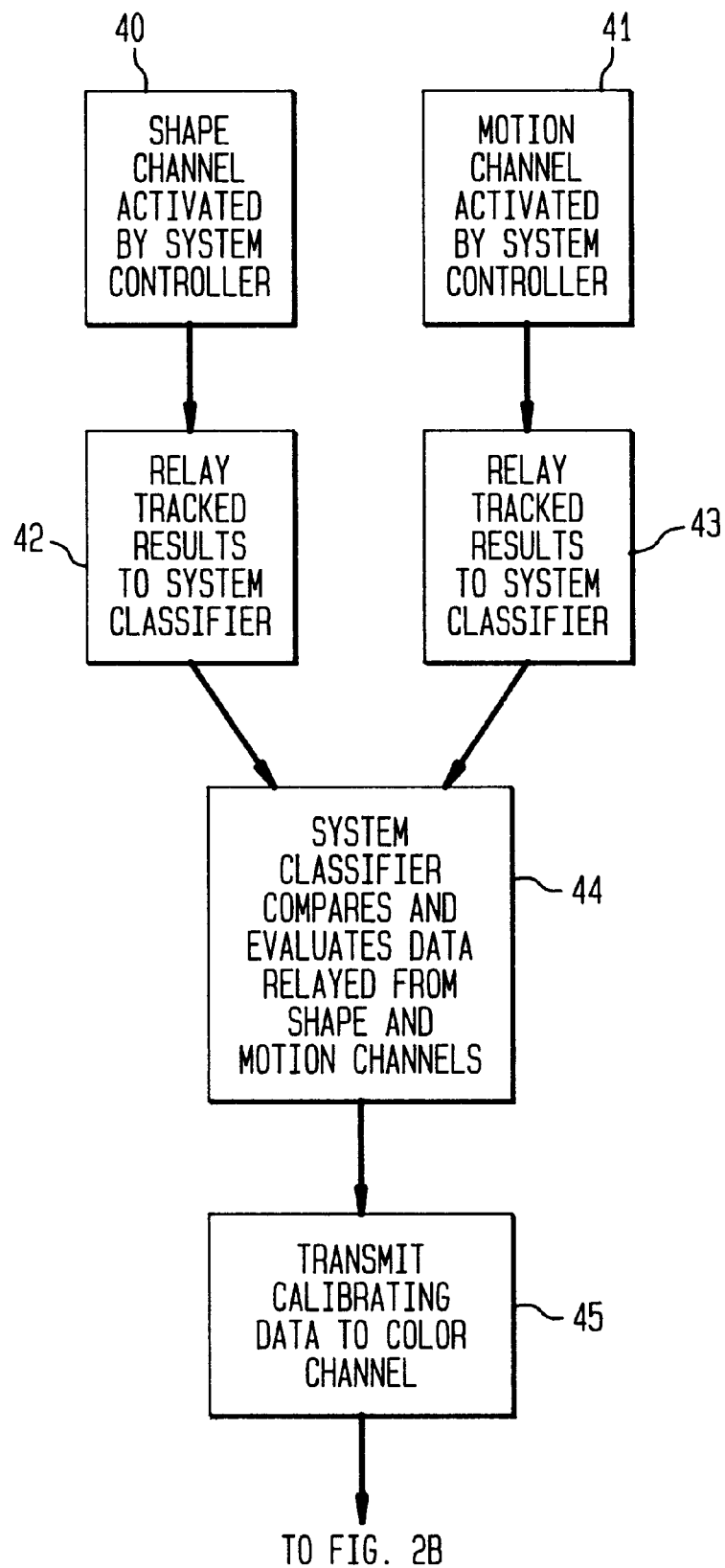

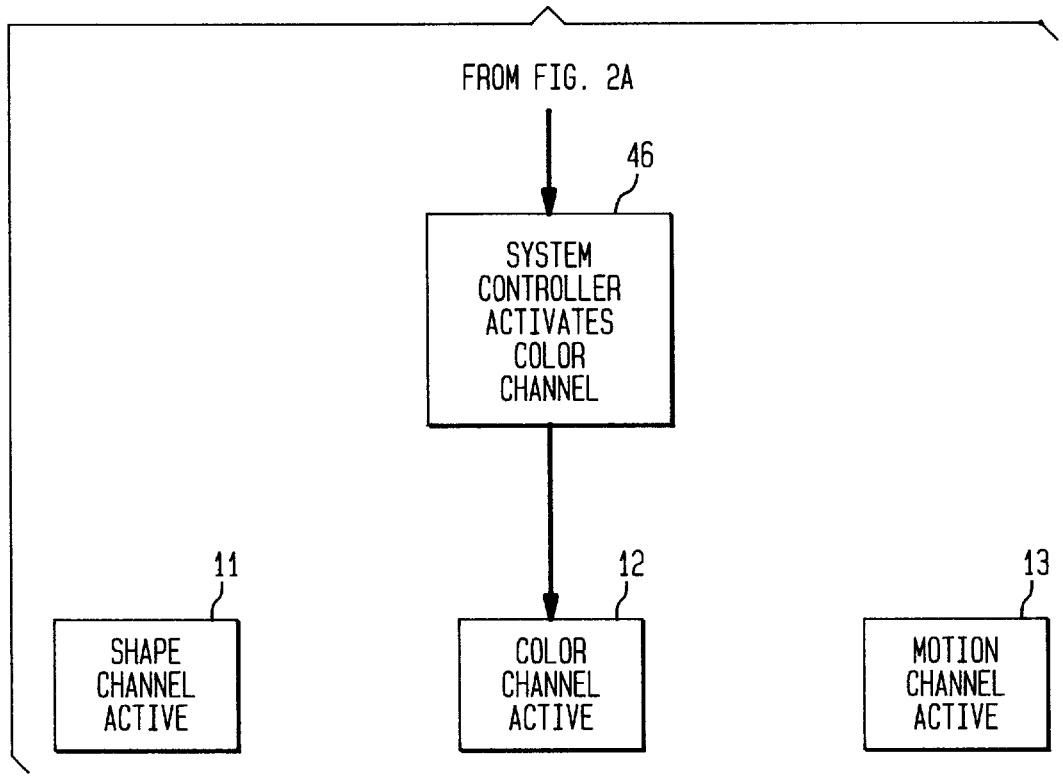

ROBUST MULTI-MODAL METHOD FOR RECOGNIZING OBJECTS

BACKGROUND OF THE INVENTION

The present invention relates to methods for tracking heads, faces, facial features, and other objects within complex images.

Although the principles of this invention are equally applicable in other contexts, the invention will be fully understood from the following explanation of its use in the context of locating heads and faces within still or moving pictures.

Various applications necessitate the design of a method for locating objects, such as heads and faces, within complex images. These applications include, for example, tracking people for surveillance purposes, model-based image compression for video telephony, intelligent computer-user interfaces, and other operations.

Many algorithms for recognizing faces in images, and for tracking individual facial features, have been described in the literature. A common drawback shared by these algorithms, however, is that they routinely fail when implemented in environments involving varying conditions such as lighting or camera characteristics. This problem can be traced in part to the reliance of many of these algorithms on a single modality to represent the tracked data. For example, an algorithm which uses color as its single modality usually fails when the background colors of the tracked image are similar to skin colors. Likewise, an algorithm using shape as its sole classifier may falsely recognize extraneous background objects to be heads or facial features.

In addition, existing tracking algorithms typically use classifiers that rely on a single type of representation. Some algorithms, for example, gather data constituting potential faces or facial features, and then represent these data exclusively in the form of binary bitmaps. The bitmaps are ultimately combined to form the tracked output. Particularly when conditions of the tracked environment vary (e.g., the person to be tracked has a light, unpronounced complexion), the final tracked result can be very poor. One reason for this result is that bitmaps in such algorithms are never evaluated or compared with other types of representations. Thus, these methods provide for little error-checking capability.

The problem of inaccurate tracking is exacerbated when the analysis relies on a single channel, or classifier, to produce its output, as in many existing algorithms. As an illustration, when a color-channel analysis yields a significant amount of tracking error due to an insufficient skin contrast in the person to be tracked, the resulting representations usually contain erroneous data. The problem yet increases when the algorithm relies on a single type of representation (e.g., a bitmap). In this case, the representation cannot be compared with other classifiers, or other types of representations, for accuracy. Hence, the corrupting data cannot be filtered out of the analysis. All of these problems create a practical limit on the achievable accuracy and robustness of tracked images, especially when adverse environmental conditions are encountered such as bad lighting.

To overcome many of these disadvantages, the inventors described an algorithm entitled "Multi-Modal System For Locating Heads And Faces." U.S. Pat. No. 5,834,630, which issued from this application, and which was pending at the date the instant application was filed and which is expressly incorporated by reference as if fully set forth herein, involves combining several different channels, or classifiers, to evaluate objects in images. Using a combination of classifiers (e.g., motion, shape, color, texture, etc.) rather than just a single classifier increases the robustness of the tracked output by enabling the tracking system to compare the results of different channels. Thus, error checking is possible by periodically evaluating and comparing the representations obtained from different channels throughout the analysis.

After the channels have gathered data for a sufficient amount of time, the system controller determines whether a different combination of channels should be used for the remainder of the analysis. For example, channels which are not perceived as producing accurate or robust results are terminated, while other channels which are producing high quality outputs are maintained. Thus, this method provides for a faster and more robust tracking method by maintaining activity on only those channels which are producing effective outputs under the circumstances of the particular tracking application.

Nevertheless, because of the wide variety of different conditions that may be encountered and the practical limitations on training a tracking system by sampling different heads and faces, a need persists in the art for a tracking method which provides for even greater capability to achieve high-quality, robust results with greater error-checking capability.

It is therefore an object of the invention to provide an improved multi-modal method for recognizing objects such as faces and facial features which provides a more flexible tracking strategy in the face of diverse camera and lighting conditions and other variables.

Another object of the invention is to provide an improved method for tracking heads, faces, and facial features which is capable of using both multiple classifiers and multiple types of representations.

Another object of the invention is to provide a more robust and accurate tracked output than existing methods.

Another object of the invention is to provide a method for tracking faces and facial features which selects a tracking strategy based on optimal speed and accuracy of the tracked output.

Another object of the invention is to provide a method for accurately tracking individual facial features including mouths making speech.

Additional objects of the invention will be contemplated by those skilled in the art after perusal of the instant specification, claims, and drawings.

SUMMARY OF THE INVENTION

These objects of the invention are accomplished in accordance with the principles of the invention by providing a tracking method which combines a plurality of representation models, together with multiple-channel capability, as needed for improving the accuracy and robustness of the tracked output. By using different types of representation models generated from multiple channels, the method can provide for accurate tracking of heads, faces and facial features under a diverse array of conditions.

The method is capable of using different representation models to portray a single feature. Depending on the application, these models may include binary bitmaps (blobs), pixel maps, outlines, moments, bounding boxes, bounding ellipses, position indicators, color information such as in histograms, and other geometric or visual representations which may be suitable for a given application.

The analysis is controlled by a model which determines the optimal tracking strategy to be used, depending on the characteristics of the individual and the environment where the images are tracked. Such characteristics may include, for example, lighting, the complexion of the person to be tracked, and other characteristics of the person such as hair color, head orientation, the presence of baldness or large amounts of hair, the presence of beards, moustaches, sunglasses, and other variables.

To achieve maximum flexibility, the use of multiple channels can be applied using multiple representation models.

In a preferred embodiment, the algorithm is initiated by an overview tracking sequence to determine environmental conditions as well as characteristics of the person to be tracked. Next, based on the results of this overview, the model selects a tracking strategy whereby the optimal representation models and channels are selected to provide for the most accurate and robust tracking result.

Once the optimal tracking strategy is determined, the selected channels are activated and the primary tracking process begins. The channels collect data based on heads, faces, and facial feature candidates in the tracked images. From these data, the channels generate the representation model types selected during the overview process. Preferably, a multi-channel combination of shape and texture analysis, color segmentation, and motion information (or some combination thereof) is implemented for locating heads and faces in fixed or moving images.

The active channels generate these representation models based on data gathered during individual frames of the algorithm. Several different representation models are preferably maintained for each facial feature candidate or other area of interest. The representation models from each channel can then be evaluated between frames of the algorithm. To be evaluated, the representation models corresponding to a feature are laid ( or positional) behind (or adjacent) a common interface. A distance metric is then used to measure similarities between the models. The resulting correlated data can then be combined with representation models of other features to form the tracked output.

In a preferred embodiment, three channels are used for tracking three separate parameters. A first channel performs a shape analysis on gray-level images to determine the location of individual facial features as well as the outlines of heads. A second channel performs a color analysis using a clustering algorithm to determine areas of skin colors. A third channel performs a motion analysis wherein motion information is extracted from frame differences. The motion analysis determines head outlines by analyzing the shapes of areas having large motion vectors.

From the above methods of evaluating and comparing different types of representation models to consummate the optimal tracking strategy and to achieve a robust tracked output, numerous embodiments and variations may be contemplated. These embodiments and variations remain within the spirit and scope of the invention. Still further features of the invention and various advantages will be more apparent from the accompanying drawings and the following detailed description of the preferred embodiments.

BRIEF DESCRIPTION OF THE DRAWINGS

FIGS. 2a and 2b depict a flow chart representing the calibration of the color channel in accordance with one embodiment of the present invention.

DESCRIPTION OF THE PREFERRED EMBODIMENTS

Figure 1A:
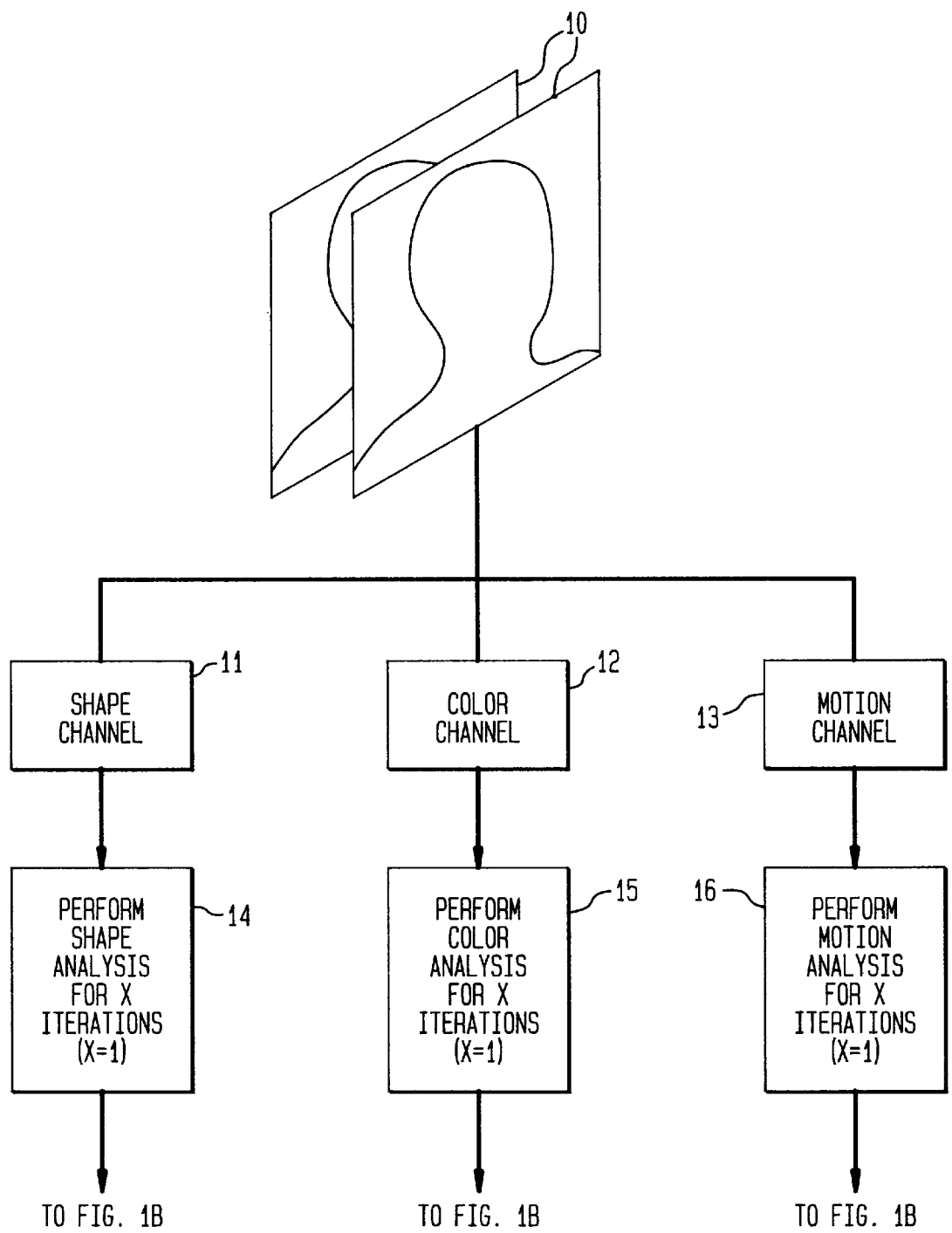
FIG. 1, also known as FIGS. 1a, 1b, 1c, and 1d, and 1e, depict a flow chart of an exemplary tracking algorithm in accordance with one embodiment of the present invention.

Referring now to FIG. 1, which depicts an algorithm in accordance with one embodiment of the present invention, images 10 are selected for tracking. It will be evident that certain steps within FIG. 1 are exemplary in nature and optional to the algorithm's implementation. The tracked objects in FIG. 1a comprise heads and facial features. The images 10 selected for tracking may comprise a single frame or a sequence of frames, and may originate from any of an unlimited number of sources. The frames may, for example, derive from a camera set up in a room. The images need not be created in a controlled environment. Images instead may be extracted from outdoors, from a dimly lit room, from an area having moving objects, or from another location. In this preferred embodiment, the algorithm is initiated by the activation of all three channels: the shape channel 11, the color channel 12, and the motion channel 13. Channels 11, 12, and 13 may be operated or invoked by a system controller or other appropriate hardware device. The channels may also be controlled by a software program.

The channels 11, 12, and 13 begin their respective analyses of shape, color and motion. The color channel 12 is provided with generic calibration parameters. These parameters may be supplied by the system controller or another source. If sufficient differences exist between the skin colors and the background colors of the images to be tracked, generic calibration parameters ordinarily suffice for the analysis.

As indicated by the steps 14, 15, and 16 in FIG. 1a, each channel 11, 12, and 13 performs its analysis for a predetermined number of iterations or frames x. Following the analyses, the channels relay their respective tracking data to a system classifier or other device (steps 17, 18, and 19, FIG. 1b). A system classifier can be broadly defined as a system or software program for analyzing data obtained from the channels. There are many types of classifiers. Typical examples are neural network classifiers and statistical classifiers. A preferred embodiment of the invention uses an n-gram classifier, as will be explained in detail below.

The data produced by each channel comprise a list of areas which may contain head outlines and facial features. Thus, each channel generates an intermediate feature representation (not shown in the figures).

The channels' intermediate representations comprise information relating to the same tracked features, even though each channel uses a different parameter (color, motion, and shape) to obtain these features. For at least two reasons, the identical nature of the channels is highly advantageous. First, the channels' results may be evaluated without the need for complex, time-consuming transformations. Second, each channel's intermediate representation is amenable to meaningful integration into a single list of likely head and facial positions.

The feature representations of the channels may be capable of visual display on a screen, but more typically they are internal data structures compatible for prompt interpretation by the system classifier. These data structures mark areas perceived by the channels as comprising head outlines or facial features.

Figure 1B:
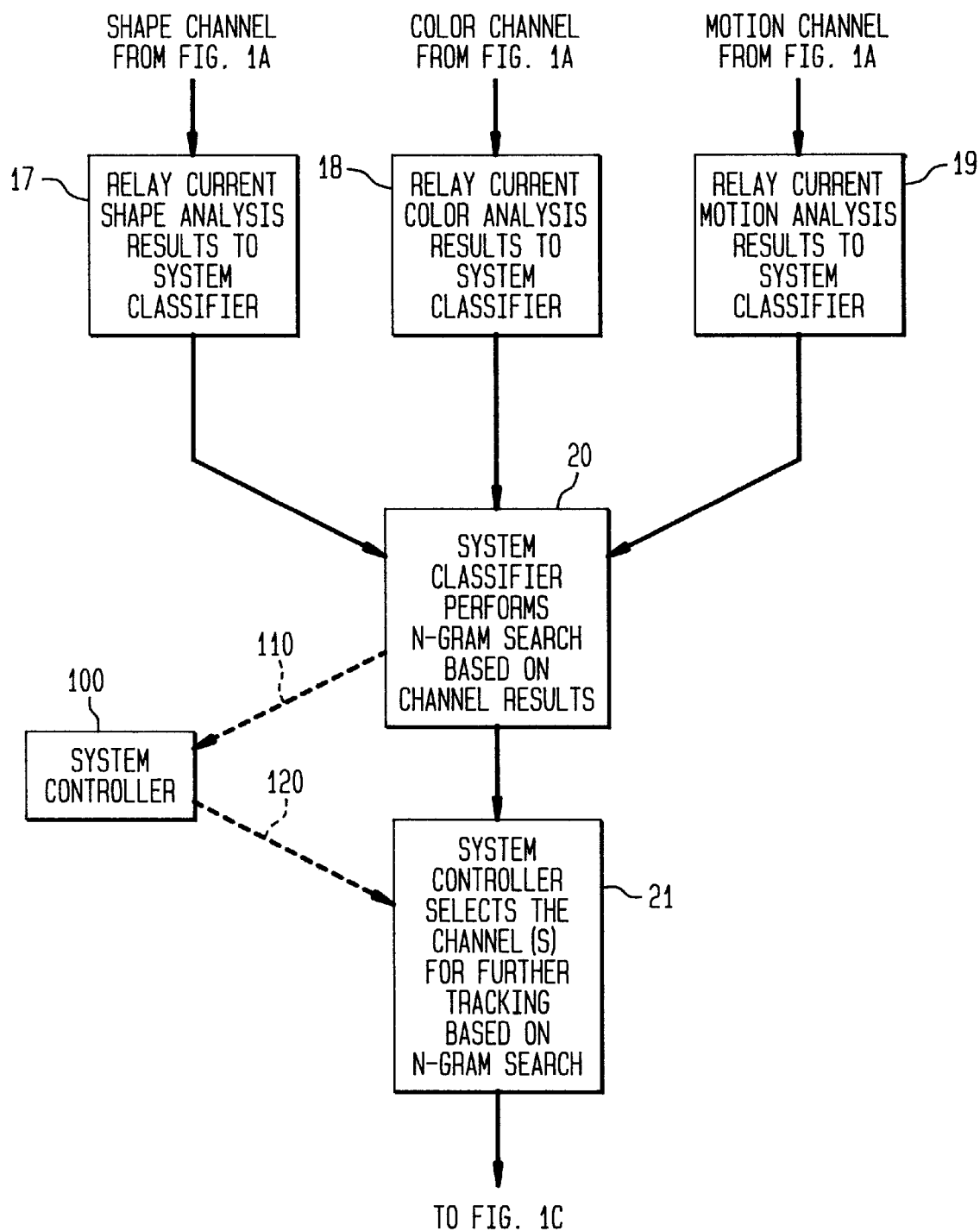
Figure 1D:
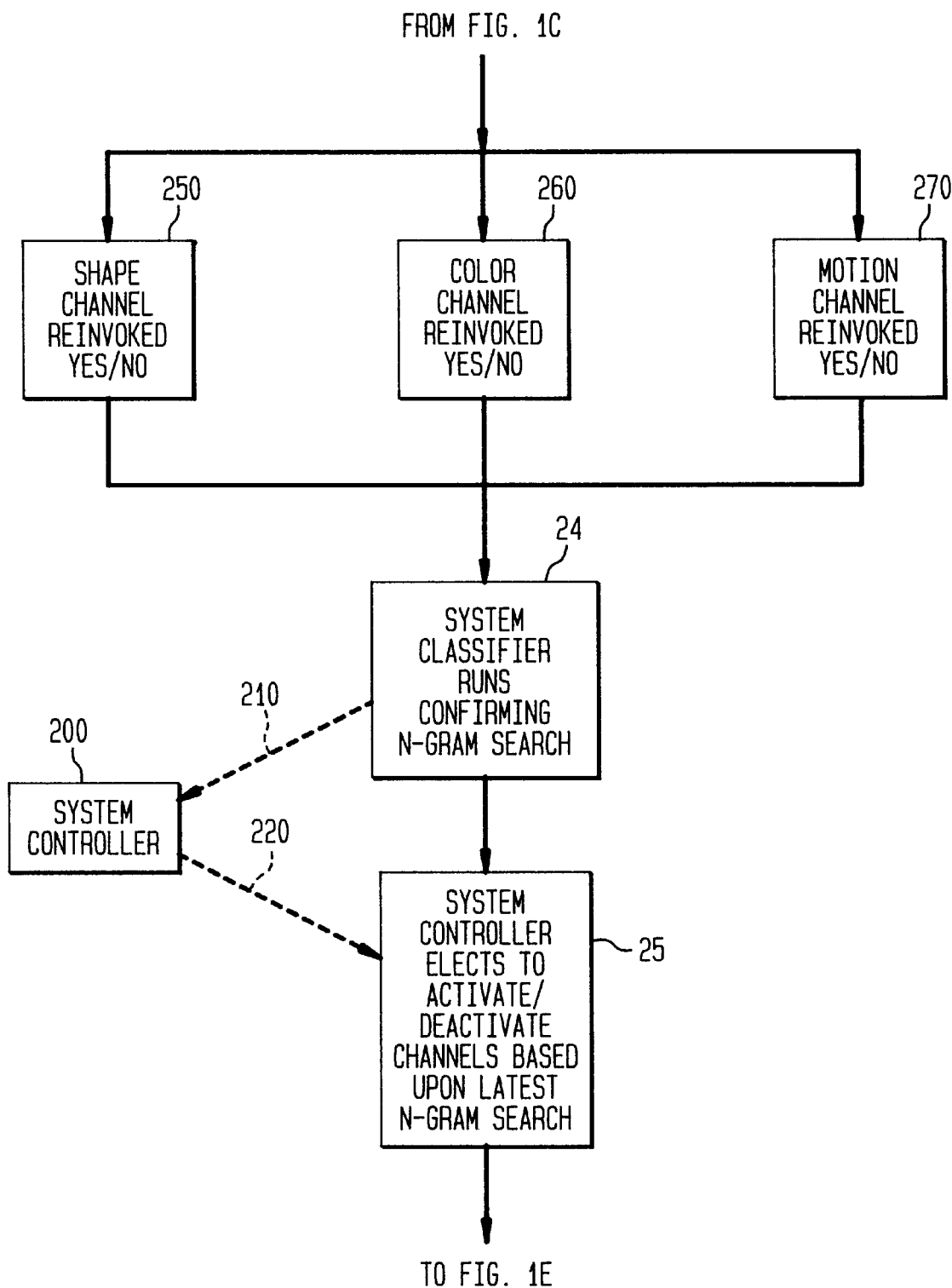

As indicated by the succeeding step 20 in FIG. 1b, the system classifier compares, evaluates and integrates the generated features. A preferred method for performing these functions is to use an n-gram search. Preferably, an n-gram search is performed after the passage of each frame wherein one or more channels are active. An n-gram search uses information obtained from all three channels to evaluate the quality of individual features, as well as combinations of features, within the representations. Using this search, the system classifier assigns a measure of confidence for each feature and each combination of features. Based on these measures of confidences produced by the system classifier using the n-gram search, the system controller determines which channel(s) should be used for further tracking to arrive at the final result.

As an illustration, the system classifier performs an initial n-gram search after it obtains the three channels' intermediate feature representations. Candidate facial features in the representations are marked with blobs of connected pixels. The classifier analyzes the shape of each individual feature, and discards those that can definitely not represent a facial feature. This stage of the search is the uni-gram search. Exemplary facial features which may be considered at the uni-gram stage are the eyes, eye brows, nostrils, mouth, chin groves, the left outline of a head, etc. The classifier associates a measure of confidence for each such feature based on its perceived level of accuracy. Next, the classifier evaluates and classifies combinations of two features in a bi-gram search. At this stage, the classifier considers whether connected components can represent a combination of two facial features, such as an eye pair, eye brows, an eye and a mouth, the left and right outlines of a head, etc. Based on this evaluation, the system classifier assigns a measure of confidence for each such combination. In the next stage, the classifier evaluates triple combinations of features in a tri-gram search, and likewise assigns measures of confidence for these combinations. Each stage of the search establishes information as to the reliability of the channels.

A tri-gram search may establish, for example, that perceived areas of skin colors reported by the color channel are accurate because the reported area falls within the perceived left and right head outlines obtained from the motion channel. Thus, the classifier would likely assign a high measure of confidence to the triple combination of left head outline, right head outline, and skin areas. From this and other information, the classifier may deduce that the color and motion channels are producing reliable information. Thus a high score may be given to the color and motion channels, as described below. In other situations, the color channel may be inaccurate. For instance, the perceived areas of skin colors reported from the color channel may not fall within head outlines reported from the motion channel. By the same token, the perceived mouth area reported by the shape channel may be accurately positioned within the head outlines. Based on this information, the classifier would likely assign a low measure of confidence for the skin color area, but a high measure of confidence to the triple combination of head outlines and the mouth area. These results potentially reflect a low reliability for the color channel 12, and higher reliabilities for the shape 11 and motion 13 channels.

The n-gram search may continue until sufficient data is obtained for the system controller: (1) to calculate, based on the obtained measures of confidence, which channel(s) is/are best suited for further tracking; and (2) to integrate, using the classifier or other dedicated program, the individual feature representations into a net representation for maintaining the tracked results. Feature representations obtained from future tracking steps are later integrated into the final output using one or more additional n-gram searches following each frame.

One goal of the invention is to arrive at the intermediate representation stage as quickly as possible. The earlier the generation of the feature representations, the faster the performance of a channel, and the faster the selection of channel(s) for additional tracking. In this manner, information relating to the tracked objects will be made available to the controller at a very early stage in the process. The total tracking time is consequently decreased. With the present invention, the results from channels 11, 12, and 13 are relayed to the system controller after a single iteration (i.e., x=1). Thus the system obtains channel evaluation at a very early stage in the analysis.

The interaction between the system classifier and the system controller is illustrated in FIG. 1b by the box 100 and the two dashed lines 110 and 120. The results of the n-gram search are made available to the system controller 100, as represented by the dashed line 110. These results are used as part of the selection step 21 described below. The use of the results for channel selection is represented by the dashed line 120 and step 21.

In the next step 21 depicted in FIG. 1b, the system controller determines which channels to select for further tracking. The selection is made based on the results of the n-gram search described above. In a preferred embodiment, the controller determines a general score Y1, Y2, and Y3 for each channel 11, 12, and 13. The determination of a general score facilitates the selection process. A variety of suitable means exist for determining the channels' general scores. Preferably, the system controller computes these general scores from the measures of confidence determined by the system classifier for individual features and combinations in the n-gram search. The controller then selects additional channel(s) to be used based on the channels' general scores. In making its channel selection based on general scores, the controller may select the channel(s) with the highest score (s). Alternatively, the controller may take additional variables into account, such as the relative speeds of the individual channels, before making its selection.

In addition, a fixed threshold measure of confidence may optionally be identified with each channel. This fixed quantity may, for example, represent the lowest permissible score for a channel. The quantity may vary depending on the terms of the algorithm or the nature of the images to be tracked, or other factors.

As an illustration, if the shape channel 11 has a subthreshold general score, continued use of that channel may produce unreliable results. Thus the analysis may continue using only color 12 or motion 13 analysis, or both. As another example, if the shape 11 and motion 13 channels' confidence measures exceed their respective threshold values, the system controller may decide to run only the shape analysis for a designated number of frames. Whatever channel is ultimately chosen, the tracking process is much faster because only one or two parameters are measured for several frames. This method is therefore superior to methods involving the full and continuous use of all three channels.

Depending on the confidence measure of each feature, the size of the microprocessor in the system controller, the complexity of the images to be tracked, and other factors, numerous approaches to the algorithm will be contemplated. Such variations are intended to fall within the scope of the invention.

In the next step 22 in FIG. 1c, the controller implements the channel or combination of channels to be run for a selected number of frames. For example, often the color analysis is perceived to be reliable based on the n-gram search results. Running the very fast color analysis alone for several frames advantageously increases tracking speed. Thus, if the color channel has a high enough general score Y2, the system controller may select the color channel 12 to run for a predetermined number of frames.

In other situations, the color channel 12 will have a low general score Y2. In that case the controller may instead activate the shape 11 or motion 13 channels, or both, for a predetermined number of frames. The controller will therefore select a tracking strategy which minimizes the effect of the color channel 12 on the final output.

The particular channel selection, of course, will vary depending on the search results. The state of each channel (on or off) following channel activation is illustrated by boxes 150, 160 and 170.

Following this sequence of steps representing the initial channel selection by the system, the active channels continue to extract information in subsequent frames using the above described methods. Preferably, the classifier runs its analysis after each frame as the tracking algorithm proceeds. Thus one or more additional frames, together with a corresponding classifier analysis of each frame, are generally represented by box 22a. The passage of frames represented by box 22a may continue for a predetermined time or until the system controller prompts a change in the tracking procedure. A change may occur, for example, where the system controller deactivates activity on the channels. A change may also occur where the system controller elects to reinvoke additional channels or deactivate selected channels as described below.

Figure 1E:
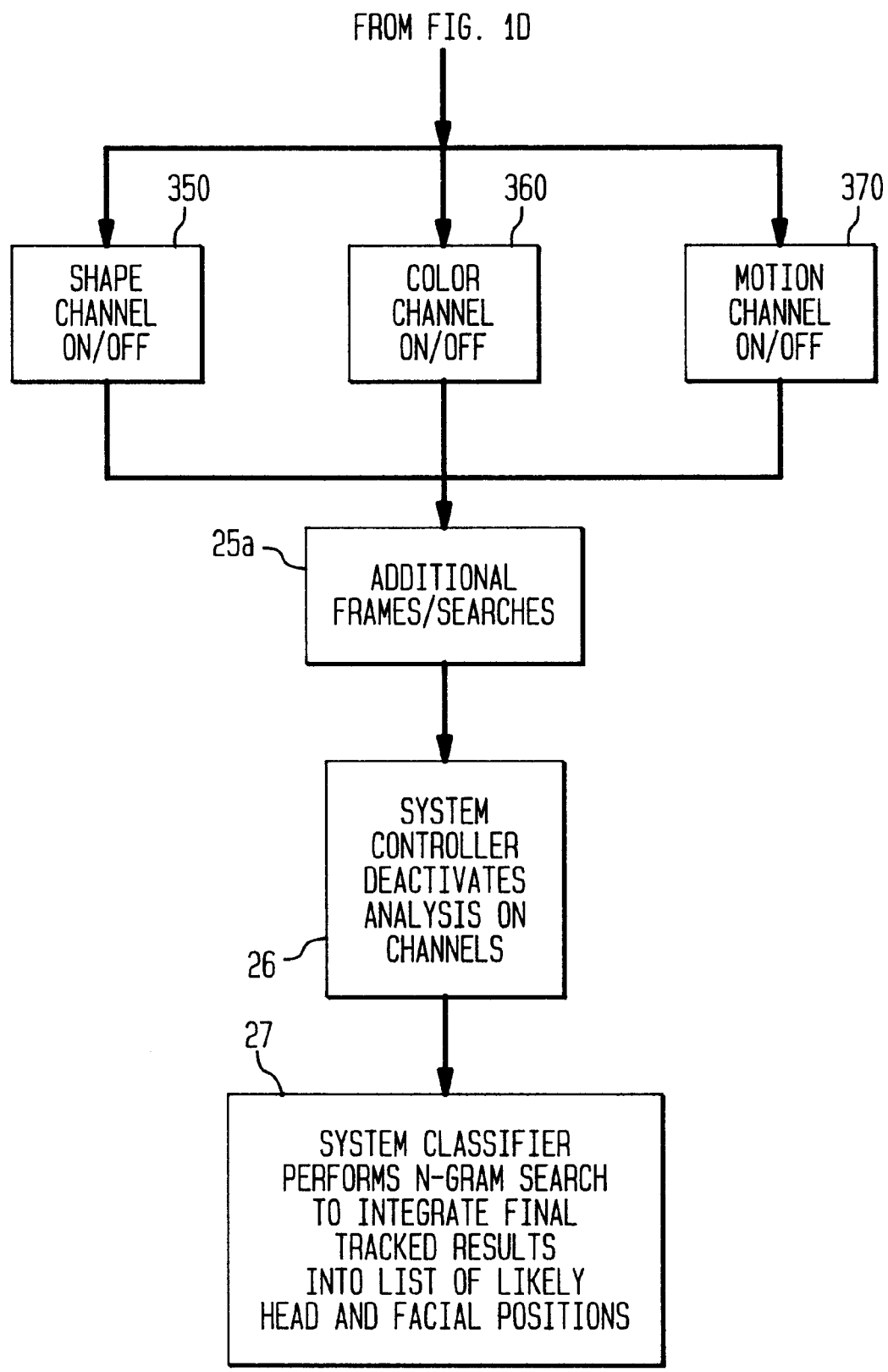

The system controller may decide to reactivate one or more channels at a later point in the tracking process, as illustrated by step 23 in FIG. 1c. The controller may reinvoke channels for a numerous reasons. For instance, the controller may elect to reconfirm results currently being obtained based on a previous channel selection. Reconfirmation is useful, among other situations, where an activated channel's general score Y was previously computed at a borderline value. Additionally, the controller may opt to reattempt use of the very fast color channel 12, which was previously rejected as unreliable by an earlier n-gram search. The status of the channels after the reinvocation of additional channels (step 23) is represented by boxes 250, 260, and 270. After the newly reinvoked channel has run for a frame, the controller invokes the classifier as usual to perform an n-gram search to evaluate the newest results (step 24, FIG. 1d). Based on these search results, the controller may activate or deactivate one or more selected channels to maintain tracking speed and accuracy (step 25, FIG. 1d). The interface between the controller and the classifier is represented by box 200 and corresponding dashed lines 210 and 220. The interface is analogous to the controller interface of FIG. 1b. In FIG. 1e, boxes 350, 360 and 370 represent the current state of the channels (i.e., on or off) following the activation step 25.

The following example illustrates the subsequent use of channels for reconfirmation. The controller determines in step 23 that the color channel 12 is best suited for further tracking. The color channel 12 is therefore invoked for several additional frames x1. No shape and motion computations are required during this time. In a preferred embodiment, x1 =10, but in practice the quantity x1 can cover a wide range and still facilitate effective tracking. After the passage of x1 frames, the controller activates the motion channel 13 for a selected number of frames x2. The motion channel 13 and the color channel 12 run concurrently for x2 frames. The quantity x2 is selected by the controller. Preferably, x2 <10. After the passage of each frame during the x2 frames, the controller compares the results of the motion channel 13 and the color channel 11 as previously described. If the color channel 11 receives a high general score Y2 for each frame based on high feature-based measures of confidence, the accuracy of the color channel is confirmed. In this event, the controller may either conclude the analysis or track for additional frames using only the color channel 12. Conversely, if the n-gram searches reveal that the color channel had lost its accuracy, the controller may select another combination of channels to run for the remainder of the algorithm.

In the example above, the color channel runs for a total of x+x1 +x2 iterations, the shape channel runs for x+x2 iterations, and the motion channel runs for x iterations where x=1 (typically), and x2 is typically less than 10. During the majority of this process, only the very fast color segmentation process need be calculated (plus reduced analyses of the shape and/or motion channels 11 and 13). This method saves considerable computation time as compared with previous processes that run a full analysis of all three channels. Moreover, this method achieves a high accuracy due to the availability of multiple tracking parameters.

The controller may alternatively determine that the shape channel 11 is best suited for further tracking (step 21, FIG. 1b). The controller may also reinvoke the color channel 12 at a subsequent time in the analysis. If a higher general score Y2 for the color channel is later obtained, the results of the color channel may then be integrated into the final tracked output. The controller may also implement a calibration procedure for the color channel 12, and then reinvoke use of that channel.

Additional frames may pass, with corresponding searches run after each frame, using the activated/deactivated channels from step 25. This sequence of frames is generally represented by box 25a. Also, during the course of the algorithm, additional channel confirmation/activation steps may be performed (e.g., steps 23–25) depending on the quality of the obtained representations, or at the instigation of the controller, etc.

The system controller concludes the tracking analyses by deactivating all active channels (step 26, FIG. 1e). The channel-based tracking analysis is now complete. Together with information already obtained from previous frames, the system classifier evaluates and integrates the final data (step 27, FIG. 1e). An n-gram search is preferably used to integrate the final output data. Using the n-gram method, features and combinations of features are again evaluated and classified, and the controller selects lists of perceived areas based on these classifications. In the end, the tracked output comprises a list of likely head and facial positions within the tracked images.

In sum, depending on the reliability of the channels as determined by the n-gram searches, the controller selects among a plurality of appropriate tracking strategies. The controller generally elects the strategy which maximizes both the speed and accuracy of the system. To maximize speed and accuracy, the system controller selects only the most reliable channel(s) to perform the majority of the tracking. The controller makes this selection by evaluating reliability data produced by the classifier.

Another preferred embodiment is depicted in FIGS. 2a and 2b. Here, the color channel is calibrated prior to activation. Calibration is particularly desirable where the background colors on the images to be tracked are akin to the facial colors. Proper calibration enables the color channel 11 to summarily reject background and extraneous colors on the tracked images. A faster, more precise color analysis is therefore achievable.

To accomplish calibration, the system controller first activates the shape 11 and motion 13 channels (steps 40, 41, FIG. 2a). These channels perform their usual analyses. After some predetermined number of iterations (often a single iteration), the shape channel and motion channels 11 and 13 relay their current results to the system classifier (steps 42 and 43). In the next step 44, the system classifier compares and evaluates the relayed data. This data may now be used to calibrate the color channel 11. Advantageously, the evaluation step 44 comprises a straightforward processing of data since the shape 11 and motion 13 channels use identical output formats as previously discussed.

Next, in step 45, the newly-formulated calibration parameters are transmitted to the color channel 12. In the next step 46 (FIG. 2b), the controller activates the color channel 12. All three channels are now performing their respective tracking analyses. The remaining steps of the process may proceed pursuant to any of the other embodiments, such as steps 14, 15 and 16 in FIG. 1a.

As an alternative to the above embodiment, the system controller may deactivate the shape 11 or motion 13 channels, or both, after calibrating the color channel 12. While calibration preferably occurs at the beginning of the analysis, it may occur at subsequent stages. Calibration may also be accomplished using a single channel such as the shape channel 11.

Calibration enables the very fast color channel 12 to produce a more reliable output. Having calibrating data to pinpoint perceived locations of heads and facial features, the color channel 12 can complete its tracking analysis more quickly and accurately. As such, the entire tracking algorithm is faster. Where background colors are dissimilar to skin colors, the calibrating step need not necessarily be performed.

The system controller may choose to activate the fast color analysis alone for the majority of the tracking process. As such, the total tracking speed is further increased. In addition, the controller may subsequently invoke one of the other two channels 11 and 13 to confirm results obtained from the color channel 12. Accuracy is thereby achieved without the need for time-consuming computations like in prior art algorithms.

The preferred modes of operation for the particular channels will now be discussed.

Shape Analysis

It will be understood that the shape analysis may be implemented using a variety of appropriate methods. The method presently preferred by the inventors is set forth below.

The shape analysis seeks to find outlines of heads or combinations of facial features which indicate the presence of a face. Preferably, the shape analysis uses luminance only. As such, the analysis is effective even where cheap monochrome cameras are used.

For frontal views of faces, the algorithm first identifies candidate areas for facial features. The algorithm next searches for combinations of such features to find the whole faces. In images with a low resolution, individual facial features may not be distinguishable. A person may also turn away from the camera so that only the back of the head is visible. In such cases the algorithm seeks to find the outline of the head.

Figure 3:
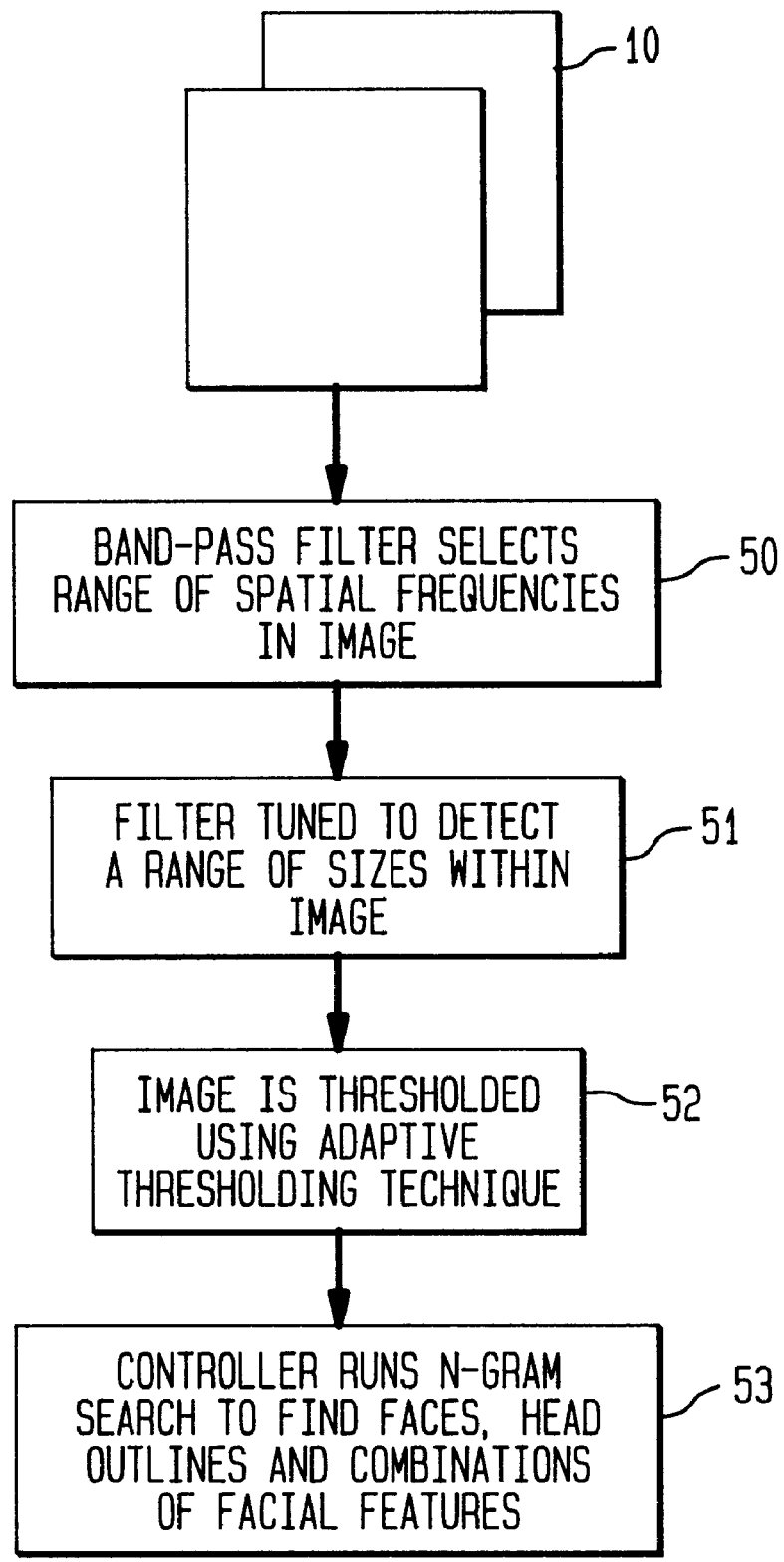
FIG. 3 is a flow chart representing a method for performing a shape analysis in accordance with one embodiment of the present invention.

A key element of the shape analysis is to obtain an intermediate representation of the tracked results. From this representation, facial parts or head outlines can be tracked using straightforward computations. FIG. 3 depicts a preferred shape algorithm. An image 10 is transformed by two filters in steps 50 and 51. The first is a band-pass filter. Facial features exhibit intensity variations; hence their appearance can be emphasized by selecting a band of spatial frequencies. The band-pass filter is therefore comprised of a range of cutoff frequencies whereby only images having the desired range of spatial frequencies are accepted.

After the band-pass filtering step 50, the image passes through a second filter which is tuned to detect a range of sizes of simple shape. This filtering is accomplished in step 51. The second filter convolves the image with a shape such as a rectangle or an ellipse. Using this filtering method, areas of high intensity that are larger than the structuring kernel are emphasized, while smaller areas are reduced in intensity. Steps 50 and 51 reduce variations in the tracked images due to changing lighting conditions, and enhance areas of facial features and head boundaries.

Alternatively, or in addition, texture filtering may be used. Texture filtering emphasizes areas with certain texture patterns. For example, areas of hair often exhibit strong variations in luminosity of high spatial frequencies in one direction, while in the orthogonal direction there are much less variations. Applying appropriate high-pass filters can emphasize such areas. Filtering for size then rejects random noise that tends to be emphasized also by a high pass filter.

After the filtering operations 50 and 51, the image is thresholded with an adaptive thresholding technique 52. The purpose of this technique is to identify the positions of individual facial features by using a simple connected component analysis. If the threshold level is selected properly, the areas of prominent facial features will become visible. In particular, areas such as eyes, mouth, eye brows, and the lower end of the nose are marked with blobs of connected pixels which are well separated from the remainder of the image. The algorithm can then locate the position of a face by searching for appropriate combinations of these blobs. The images are treated similarly for finding the outline of a head. For the head, however, both vertically and horizontally extended regions of high spatial frequencies are filtered out by the band-pass filter.

Once candidate facial features are marked with connected components as described above, combinations of such features which represent a face are next sought. This step 53 is preferably accomplished using the aforedescribed n-gram method. The method discards connected components which cannot comprise facial features, and assigns a measure of accuracy to the remainder.

At each stage of the search, the connected components are evaluated with small classifiers that utilize inputs such as component size, ratios of distances between components, and component orientation.

The search for the head outline proceeds in a similar manner. The first search scan selects those connected components that can represent left or right boundaries of a head. Next, the system classifier examines combinations of left and right edges. Finally, combinations of vertical and horizontal edges are evaluated. The head outline is approximated with an ellipse, and the coverage of an ellipse by connected components is taken as a measure of the quality of the fit. In addition, if results from the other two channels are available, they may be included in the n-gram search.

Figure 8:
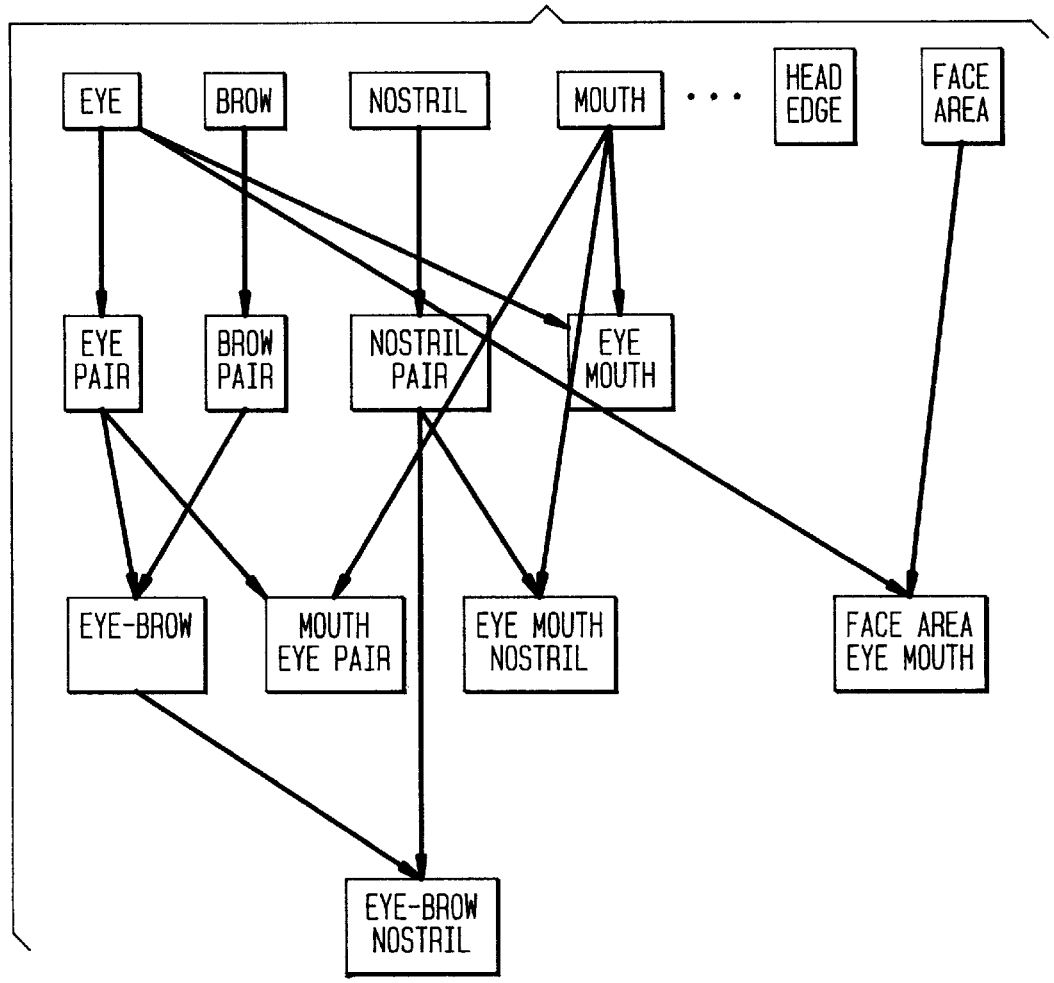
FIG. 8 is a schematic representation of an n-gram search.

A exemplary schematic of the n-gram search is shown in FIG. 8. This n-gram search depicted is used to classify combinations of shapes to make a decision whether or not a face is present in the image.

The computation of the n-gram search increases exponentially with n, the number of different components taken into account. Thus, the search is potentially costly and time-consuming. However, by using the hierarchical search algorithm described above and by eliminating components with low measures of quality from consideration, the computation can be kept very fast. In fact, the computation for the whole shape analysis is dominated by the time for the band-pass filtering step 50 and the shape filtering step 51. A typical search time for the shape analysis, using a 150 MHZ pentium microprocessor to track an image with a size of 360×240 pixels, is less than 0.5 seconds.

Certain parameters are required to implement the shape analysis. These include the cut-off frequencies of the band pass filter, the size of the structuring kernels for the shape filtering, and the thresholds for binarizing the results. These parameters may be determined using a method such as a fully automatic training procedure. In a preferred method, one-hundred images of twenty-five people are used to establish measurements for input into the tracking system. In the training procedure, the positions of the eyes, the left and right end points of the mouth, and the lower end of the nose can be measured by hand. Next, the sizes of the connected components representing facial features are measured. For an automatic optimization of the parameters, a quality measure of the following form is useful:

$$S=100-(a*(x-x(0)))-(b*(w-w(0)))$$

where
  S=quality of the marking of the feature
  x=position of the connected component
  x(0)=desired position of the connected component
  w=width of the connected component
  w(0)=desired width of the connected component
  a, b=scaling factors Thus, an independent optimization of each parameter may be performed by scanning one parameter over its whole range of values while keeping the other parameters constant.

When tracking parameters are properly chosen, the facial features may be accurately tracked over a wide range of scales and conditions. For instance, eye regions may be found regardless of whether the eyes are open or closed. The same is true for mouths. Whether the mouth is open or closed has little influence on the ability of the described technique to mark the correct area on the image.

Advantageously, this approach enables the system to track a wide range of sizes of facial feature using a single set of parameters. Other existing approaches are inferior. For example, existing methods which use filters designed for detecting whole heads or faces tend to be very scale sensitive. Thus, for those methods, many search scans need be performed to permit the tracking of faces covering a range of sizes. The shape-tracking technique of the present invention, however, can handle a range of head sizes of more than a factor of two. As an additional benefit, the invention accommodates such variances using a single set of parameters.

Color Analysis

Figure 4:
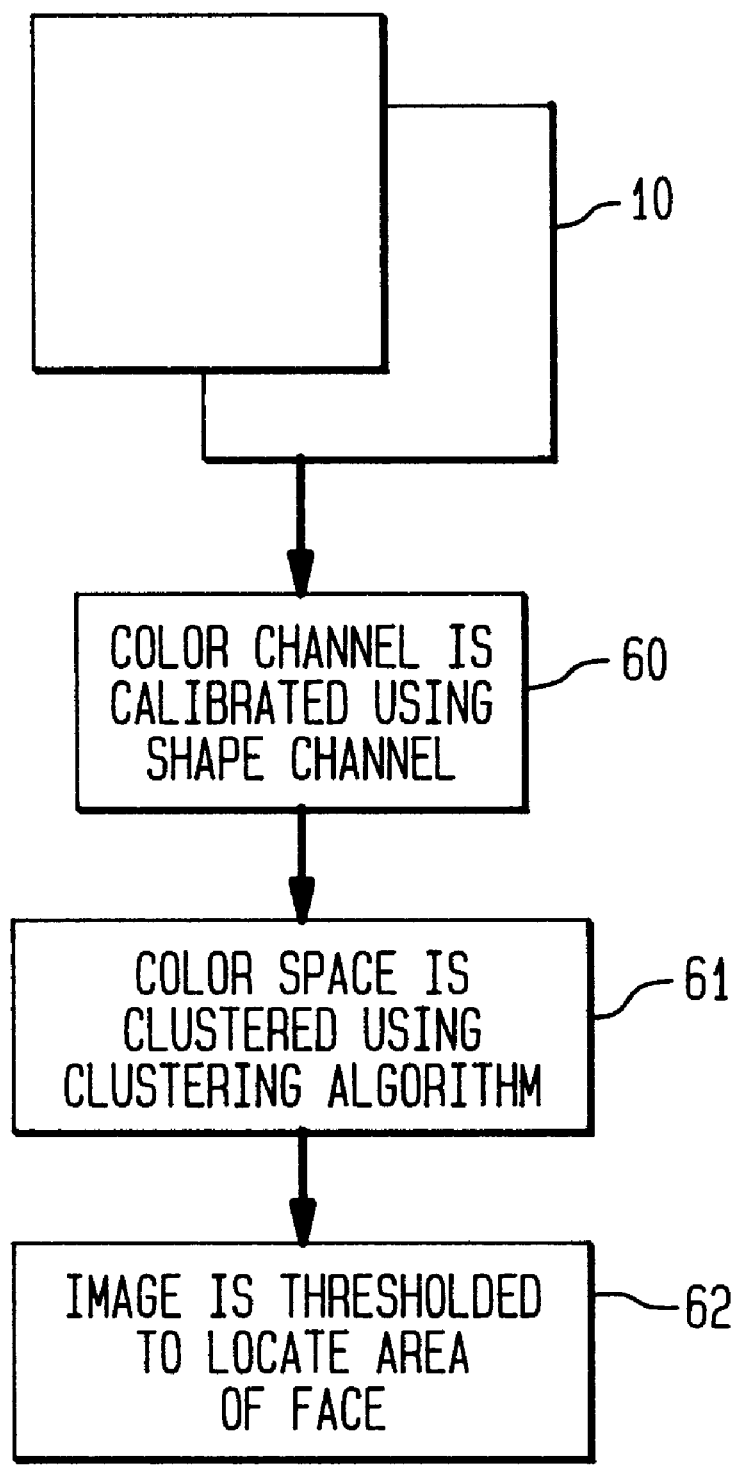
FIG. 4 is a flow chart representing a method for performing a color analysis in accordance with one embodiment of the present invention.

FIG. 4 depicts a color algorithm in accordance with the present invention. The following algorithm comprises a preferred method of performing a search based on color; however, other suitable methods may be contemplated. Color information is an efficient vehicle for identifying facial areas and specific facial features. However, the system must often be calibrated to accommodate specific conditions. Unfortunately, these calibrations can usually not be transferred to different cameras and to strongly varying conditions in the illumination. Skin colors can vary considerably. In addition, skin colors are often indistinguishable from similar background colors. For this reason, color analysis in the present invention is used only in combination with shape and motion analyses. Particularly where colors are difficult to distinguish, the color channel should be calibrated first.

After a calibration step 60 the color space is clustered with a leading clustering algorithm for finding a whole space, as in step 61. In this algorithm, one or two cluster centers are initialized to skin colors of a part of the face identified by the shape analysis. Normalized rgb values are chosen as color space:

r=R/(R+G+B)
  g=G/(R+G+B)
  b=B/(R+G+B)

Using normalized rgb values advantageously minimizes the algorithm's dependence on luminance. Dark pixels (R+G+B<30) are set to zero to avoid instabilities caused by the normalization process.

After skin colors have been identified with the calibration and the clustering process, the image is next thresholded in order to locate the area of the face (step 62).

When whole faces alone are to be tracked, color information is used only to identify larger areas. In such a case, the tracked image is typically subsampled to 40×30 pixels using bilinear interpolation. After binarization, each segment in the image is analyzed for its shape and size to determine whether or not it can represent a face. Faces are often the dominating set of connected components in the image, and thus the face position can be easily identified. Using a 90 MHZ pentium microprocessor, the typical time required for the color analysis following calibration is 10 milliseconds.

Motion Analysis

If multiple images of a video sequence are available, motion is often a parameter that is easily extracted. This parameter provides a quick method to locate an object such as a head. The first step in a preferred motion algorithm is to compute the absolute value of the differences in a neighborhood surrounding each pixel within the image to be tracked. A typical neighborhood is 8×8 pixels. When the accumulated difference for a pixel is greater than a predetermined threshold T, the system controller then classifies that pixel as belonging to a moving object. T is typically set at 1.5 times the temporal noise standard deviation, times the number of pixels in the neighborhood.

Applying the threshold to the accumulated difference as opposed to the individual pixel difference results in two advantages. First, T can be expressed with increased precision. Second, the neighborhood processing has an effect similar to morphological dilation. This helps fill small gaps that occur in areas where the moving object has similar pixel values to the background. The technique is effective for use on images which contain a wide variety of cluttered background scenes.

Areas of moving objects are analyzed by using a contour-following algorithm to extract the region boundaries. For each region, the contour is smoothed, and the curvature of the contour is calculated. Feature points are identified along the contour at points of local extrema of the curvature.

The accumulated set of feature points for each region is compared to a model set of features corresponding to a head and shoulders shape. If a match is found, the head center coordinates are determined by calculating the mean value of the contour data for the portion of the contour that corresponds to the head. The size of the head is estimated as the mean distance from the head center to the contour. The temporal correlation of head center and size estimate is analyzed over several frames to identify spurious matches. Since only the outline of the head is analyzed, both front and back views, and usually also side views of heads are found.

This technique typically analyzes a frame in less than 30 milliseconds.

Combining the Channels—Training

Preferably, training procedures are used to provide the system controller with the necessary parameters for the n-gram search. The classifications are based on one or more head models chosen to represent expected situations. The models define all the size parameters required for the classifications and the order of the searches. To avoid a combinatorial explosion when exploring shape combinations, a greedy search is done, and a proper search order is thereby established. The order of the searches is based on a maximum entropy measure and is determined in the training procedure.

The model for frontal views are generated from a training set of 35 people looking into a camera. On this set the positions of the eyes and the eye pairs are measured. These measurements provide valuable information to the system controller when running the eye-pair search. Eye pairs can be found easily and reliably. The eye-pair search drastically reduces the number of shapes that have to be taken into account for further analysis. Thus, the preferred method of searching begins with the eye-pair search. Other features and feature combinations are classified in the same way, and an order of the searches is established by the training procedure.

Multiple Models

The preceding sections discuss in detail the capability of the disclosed method to use different classifiers to reach a tracked result. This section focuses on the use of different representation models within each channel. The use of different representation models increases the likelihood of a more robust and accurate tracked output. The use of different representation models also enhances the accuracy of tracking other types of more complex facial movement, such as speech.

Figure 5:
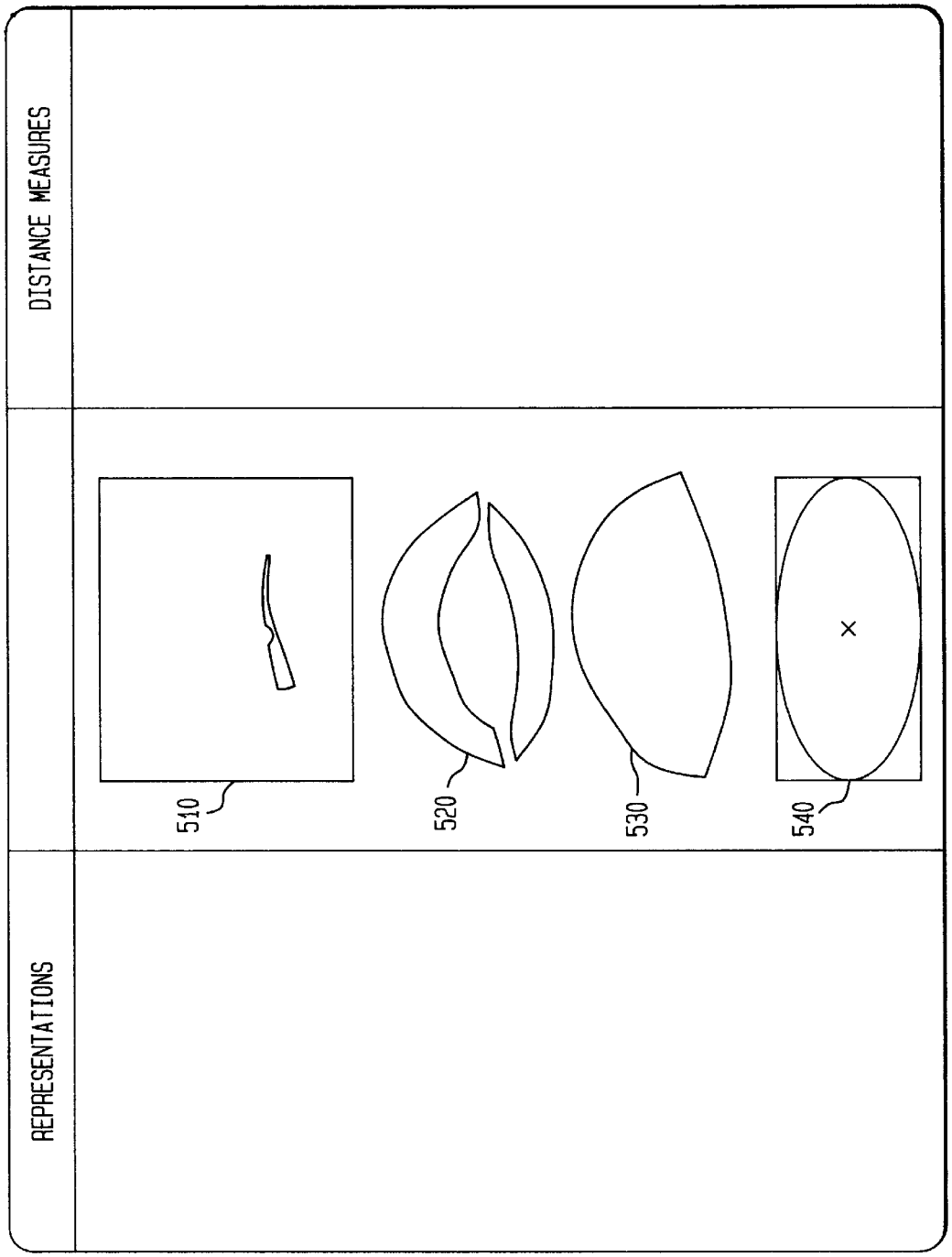
FIG. 5 is chart illustrating various representation models.

A representation model is a collection of data in a predetermined format which contains information about heads, faces or facial feature candidates. There are many types of possible representation models. FIG. 5 shows an example of some of the more common models. A pixel map 510 is a representation of data containing various values of intensity for each pixel. A binary bitmap 520 contains, for a given pixel on the bitmap, a binary one or zero corresponding to the presence or absence of a dark area. An outline 530 simply represents the outline of the particular facial feature represented. Alternatively, moments may be used to describe the shape of the feature. A bounding box or bounding ellipse 540 may also be used as a representation model. These are commonly used in conjunction with candidate pixel blobs to verify the presence of a facial features. In addition, color information in the form of histograms can be stored as representation models.

It should also be understood that for the purposes of this disclosure, the term feature is synonymous with not only individual facial parts, but also with combinations of facial parts (such as a pair of eyebrows, an eye and a mouth, etc.).

Multiple types of representation models for a particular feature are referred to herein as complementary representation models; they each correspond to the same perceived feature. Complementary representation models may comprise two or more models per feature. Where only a single representation model is used by a channel to represent a feature, the single representation model is referred to herein as a unitary representation model.

The use of complementary representation models has numerous advantages. For example, complementary representation models provide for several alternative representations of a single feature. These representations can be compared with one another, which effectively provides an error-checking mechanism. The data which correlates to the feature can be identified, extracted, combined, and ultimately integrated with representations of other features to produce a final tracked output. Using complementary representation models is especially useful when the analysis is subject to diverse conditions such as lighting and camera variations.

A preferred embodiment of the invention using complementary representation models is illustrated in FIG. 6. In this embodiment, unlike previous ones where a single representation model was assumed, multiple representation models are used. The key for any successful classification task is an accurate representation of the data. Thus, the controller may, as here, maintain more than one representation for a feature. The controller may maintain complementary representation models of pixel maps, bitmaps, outlines, moments, bounding boxes and ellipses, position information, color information, and other representations appropriate for the designated tracking application.

As in other embodiments, a combination of shape 610, color 620 and motion 630 channels are activated. For the first set of frames between 1 (N=0) and N+1 (the additional N frames are represented by box 650), the controller conducts the analysis to first locate the position of whole faces and facial features in the image. Those images, after 1 to N+1 frames have passed, can be stored as an intermediate representation (steps 660, 670) for later integration with the remainder of the tracked data. The data may be combined with an N-gram search after each frame.

Figure 6A:
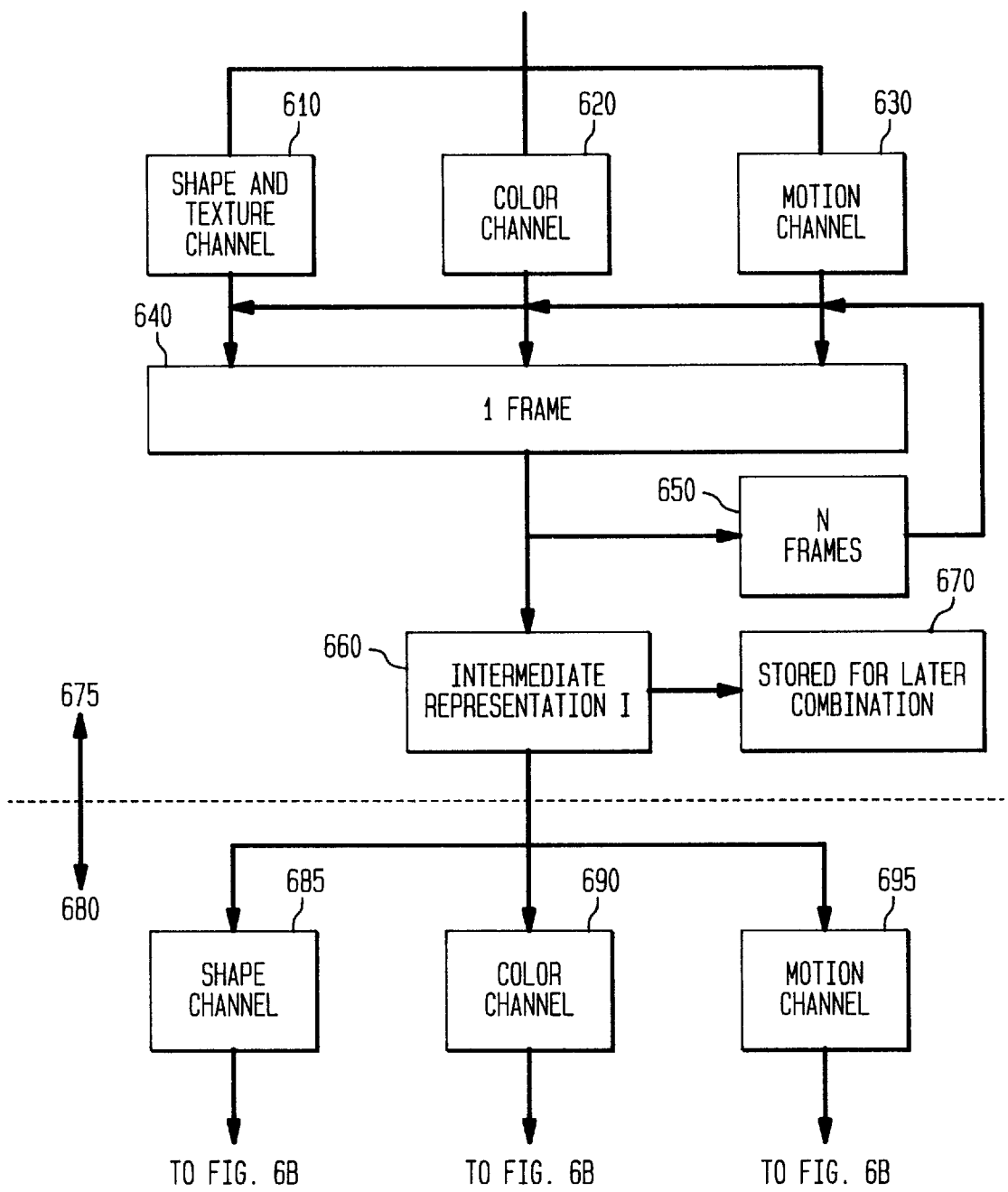
FIG. 6, also known as FIGS. 6a and 6b, is a flow chart representing a tracking method using complementary representation models according to an embodiment of the invention.
Figure 6B:
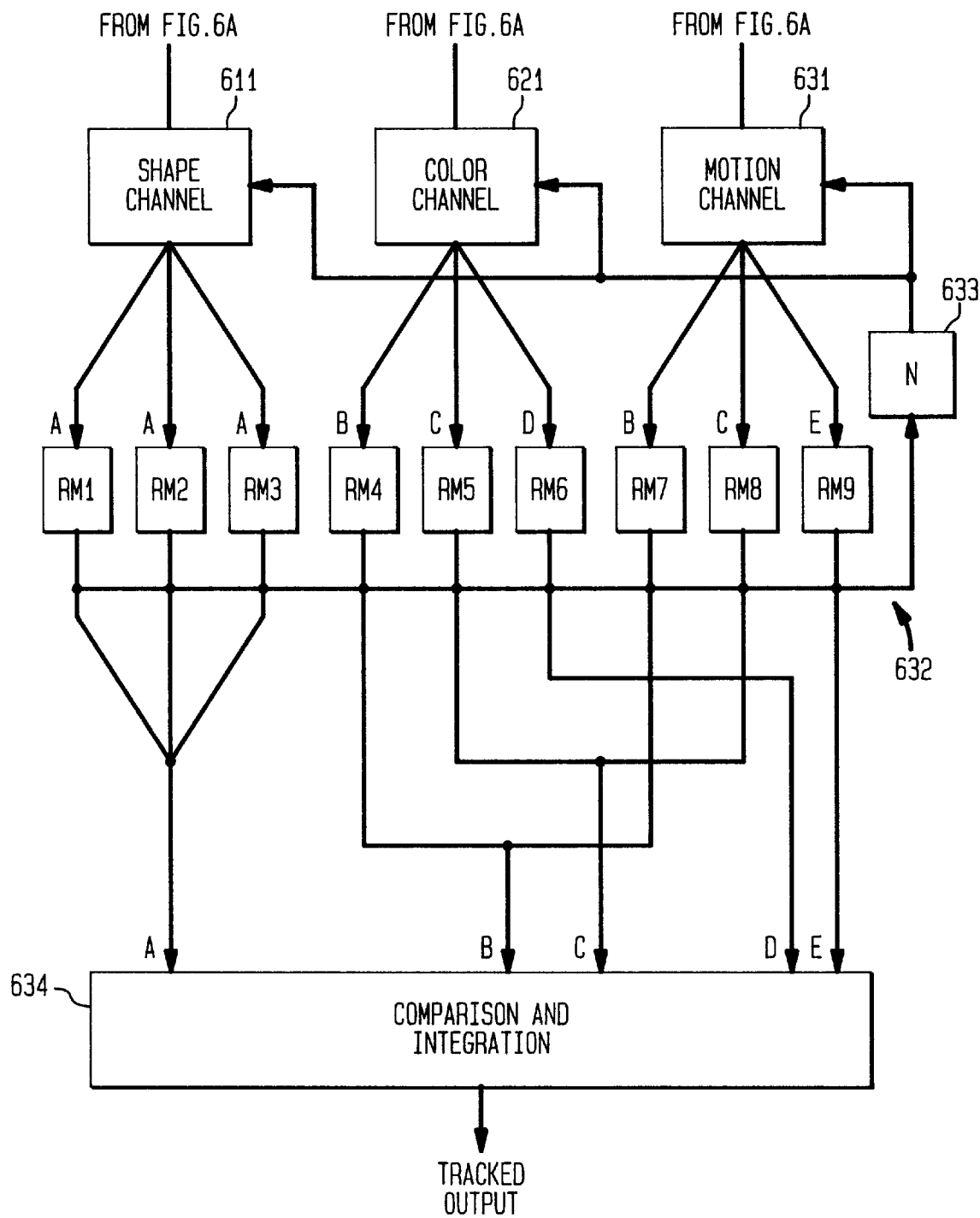

The first part of this process described above, where whole faces and prominent facial features are identified, is represented graphically by arrow 675 in FIG. 6A. Then, after the initial N+1 frames have passed and the whole faces and general facial features have been located and stored, the algorithm may then zoom in on particular facial features to analyze them in greater detail. The initiation of this process is represented by arrow 680. Beginning with the original image to be tracked, the first few processing steps N in this pass (FIG. 6B) identify areas of interest, i.e., areas where facial features may be present. The operation of the channels for N frames is illustrated in FIG. 6B by line 632, box 633, and channels 611, 621, and 631. The letters A, B and C in FIG. 6B represent different facial feature candidates considered in the analysis. During these frames, the channels gather their respective data characterizing shape, motion, and color as in the previous embodiments. In this sequence, however, the illustrated algorithm utilizes complementary representation models RM1 through RM3, complementary representation models RM4 and RM5, and complementary representation models RM5 and RM8. In the illustration shown, the shape channel generates data for three representation models, RM1 through RM3, the color channel generates data for models RM4 through RM6, and the motion channel for RM7 through RM9. For example, RM1, RM4, and RM7 might represent a pixel map, whereas RM2, RM5, and RM8 might represent a bounding ellipse, and whereas RM3, RM6 and RM9 might represent color information in the form of histograms. Thus, in this example, the controller maintains three different representations per channel. Further, in some embodiments each channel may evaluate a single feature simultaneously. In others, the channels may concurrently generate representations of different features. In the illustration of FIG. 6B, the shape channel 611 evaluates feature A which may, for example, comprise the outline of a head. The color channel 621 evaluates feature B, such as a mouth, feature C, such as the eyes, and feature D, such as the nose. Likewise, the motion channel 631 evaluates feature B (the mouth), feature C (eyes), and feature E (head). Data generated by the evaluation of these areas is then stored in representation models RM1 through RM9. Thus, in the example shown in FIG. 6B, the controller maintains three complementary representation models of feature A, two complementary models of feature B, two of feature C, and a unitary model of feature E.

The combinations represented above are for illustrative purposes only; the method can be used with respect to a variety of number and type of representation models, features to be analyzed, and other factors.

In the next step 634, complementary representation models (such as RM1–RM3) are compared and integrated to form the tracked output.

FIG. 7 shows a method of using multiple representation models. A single channel 700 is described, which is assumed to have the capability to accommodate the various representation models shown. FIG. 7 more fully explains the comparison and integration steps 634 shown is FIG. 6B, but uses a single channel for simplicity.

Figure 7A:
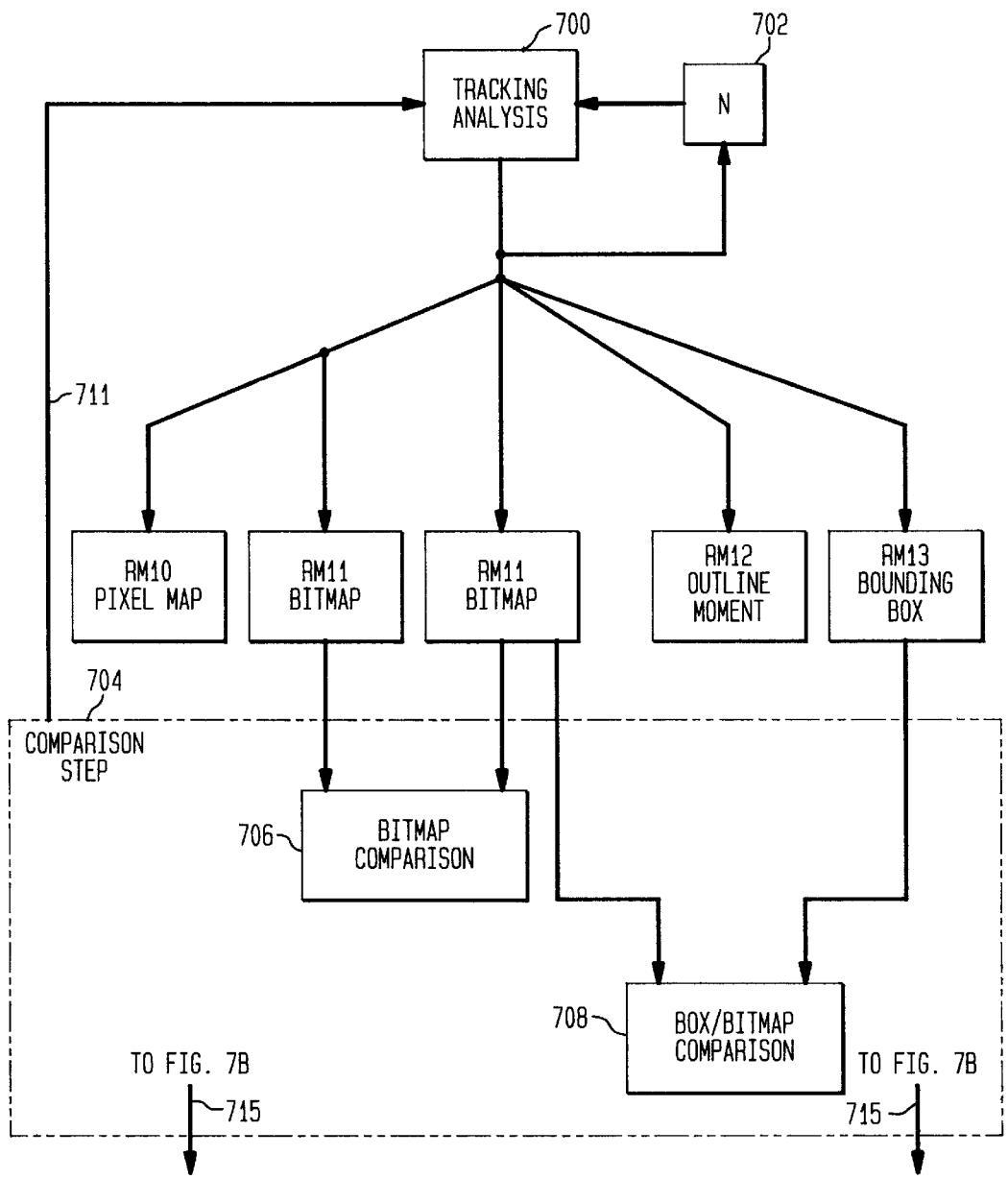
FIG. 7, also known as FIGS. 7a and 7b, is a flow chart representing a tracking method using complementary representation models according to an embodiment of the invention.
Figure 7B:
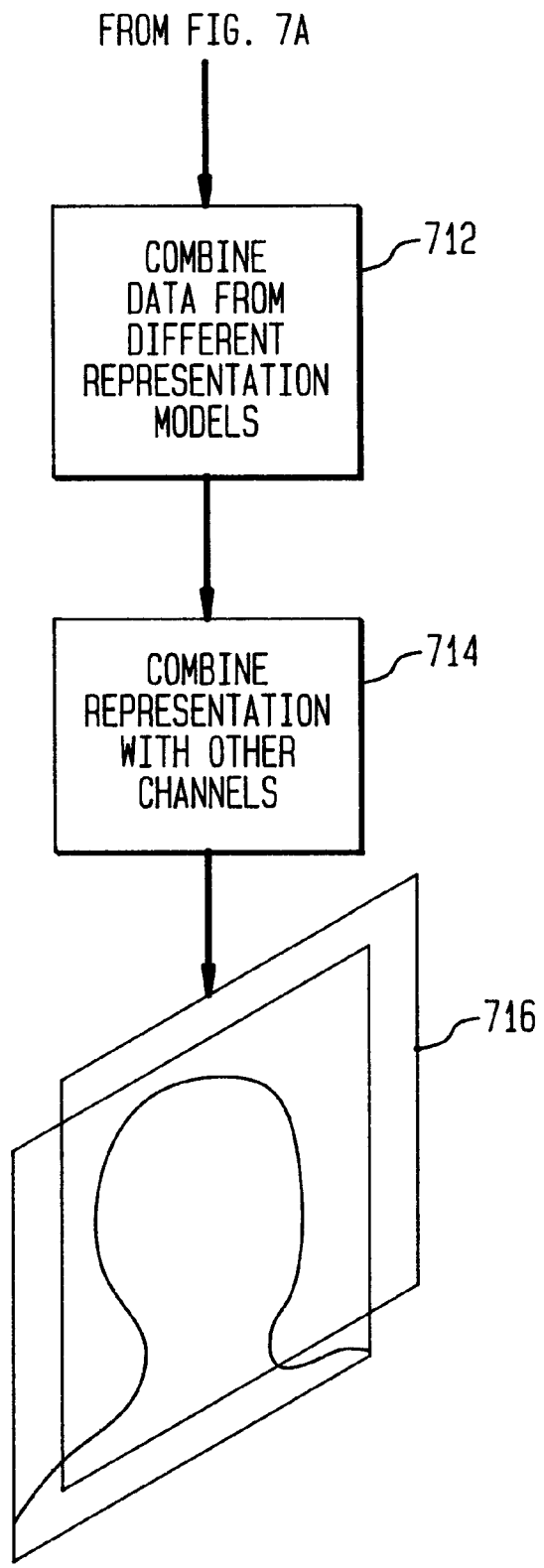

Referring to FIG. 7a, tracking analysis 700 is performed using four different representation models RM10, RM11, RM11, and RM12–13. These models may comprise, for example, a pixel maps (RM10), two binary bitmaps (RM11), an outline (R12) and a bounding box (R13). Again, the actual selection of the representation models will vary widely depending on the tracking application and the camera and lighting conditions, etc., encountered. The selection of which representation should be used is preferably governed by an initial overview process to be discussed below with reference to FIG. 8. The analysis in FIG. 7a is assumed to proceed for N frames (box 702) with the generated data preferably added to the respective representation models RM10 through RM13 after each frame. Intermediate representations of each model RM10 through RM13 are thereupon available for further analysis after the passage of N frames.

For each of the complementary representation models, a distance metric is defined to compare shapes represented by each model. This comparison step is graphically represented by box 704. The similarity between models is compared. Data representing mutual similarity between model shapes is typically reliable data indicative of a facial feature, whereas extraneous data points may well indicate noise which should be removed by the controller from the analysis.

The distance metrics are defined between identical representation models as well as between different ones. For instance, if two binary bitmaps RM11 are compared as in sub-step 706, their shapes are characterized by mutual overlaps. The overlapping data points represent data which is an accurate representation of the tracked feature. These common data points can then be integrated into the final representation of the feature to form a highly robust and accurate image. Accuracy is increased where multiple channels are used in the analysis. In a preferred embodiment, both scaled and rotated versions of two binary bitmaps RM11 are considered and their mutual overlap is taken as a similarity measure.

When a bounding box RM13 is compared with a binary bitmap RM11 as in sub-step 708, the bounding box of bitmap RM11 is first computed and then the mutual overlap is taken as a similarity measure.

Using object oriented programming techniques, the representations are hidden behind (or broadly, positional adjacent) a common interface. The use of a single interface is advantageous; shapes can be compared easily regardless of their actual representation. For an analysis of the models the same function is always called, and the object maintaining the area of interest selects the appropriate metric.

Other distance metrics may be defined for different representation models. For example, where two moments are compared, the overlap in the difference of moments is computed. Where bounding boxes, ellipses, or other bounding figures are compared, the simple overlap is computed. Where color information in the form of histograms is compared, the number and center of clusters is determined. Still other distance metrics may be defined to compare different models.

For the purposes of this disclosure, the extracted data representing the mutual overlap of shapes (or the similarity of color clusters, etc.) that result from the comparison step 704 is generally referred to as correlated data. Correlated data may then be used in the final representation to form tracked faces or facial features.

Once the comparison step 704 is performed on the various representation models, the controller has several options. The controller may opt to make additional passes to supplement, continue, or refine the tracking analysis as deemed necessary or appropriate. This option is represented by arrow 711. Instead, or in addition, the controller may combine and integrate the data from the comparison step into representations of the designated heads, faces, and facial features. This integration step is illustrated by arrows 715 in FIG. 7A and box 712 in FIG. 7B. The resulting representation may then be combined with representations from other channels (step 714) to form the tracked output 716.

The analysis preferably uses the simple representation models first. If the results are deemed satisfactory, the analysis ends. If the results are not deemed satisfactory by the controller after performing the comparison step 704 (e.g., correlation was inadequate resulting in a low degree of confidence of the net representation), then more complex representation models are taken into account. For instance, after a selection of areas of interest has been identified, the first attempt to locate a face may use bounding boxes only.

If a face is identified with a high measure of confidence, no further analysis is necessary. Such a simple analysis is extremely time effective. Under noisy conditions, however, many parts of the image may have been marked as candidates for facial features. In such a case, a simple test for geometric proportions is insufficient. Thus, each area of interest may be classified first by comparing its outline or bitmap representation with model values. Calibration by other channels may be used here. Then, taking this score into account when performing the combining step 712, a finer discrimination between facial features and noise can be made.

Selecting The Optimal Strategy

The methods described above provide a great deal of flexibility. Depending on factors such as the tracking environment, camera and lighting conditions, the purpose of the tracking, the presence or absence of noise, and other factors, the controller may select any combination of available channels, or a single channel for tracking. Likewise, the controller may select any combination of available representation models to analyze various head and facial feature candidates.

In addition, persons with a wide variety of characteristics may be encountered in any given application. The person may be bald, have dark hair, light hair, big hair (such as many females), a unique or peculiar head orientation, a beard, a moustache, sunglasses, or other characteristics. The controller can advantageously be programmed to select the optimal tracking strategy to be used, depending on the characteristics encountered in a given analysis. Various representation models can be mixed and matched. Various channels can be selected or ignored. The controller can select the strategy which provides for optimal speed and accuracy under any condition.

Figure 9A:
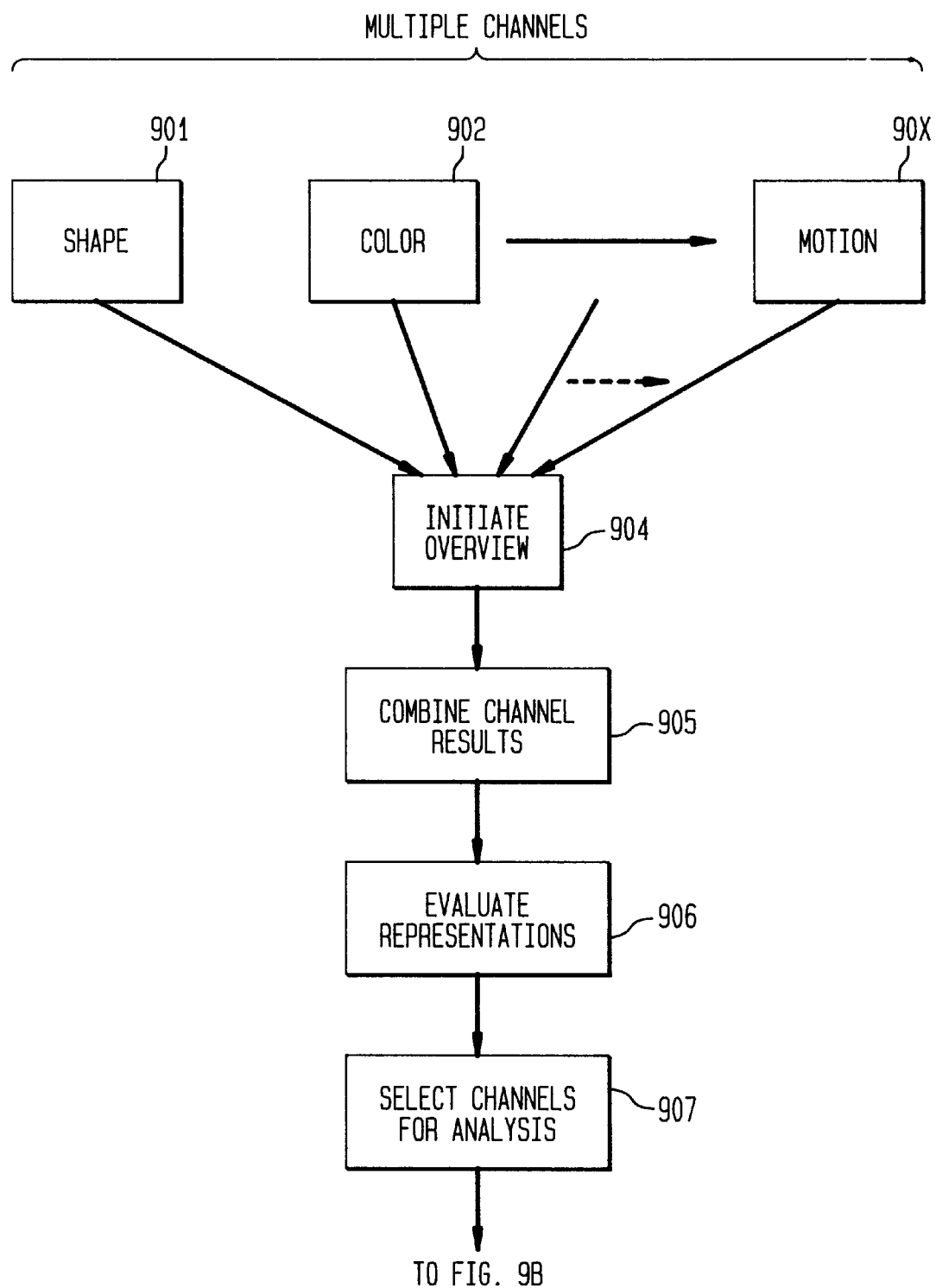
FIG. 9, also known as FIGS. 9a, 9b, and 9c, is a flow chart representing a tracking algorithm using an overview sequence according to the invention.
Figure 9B:
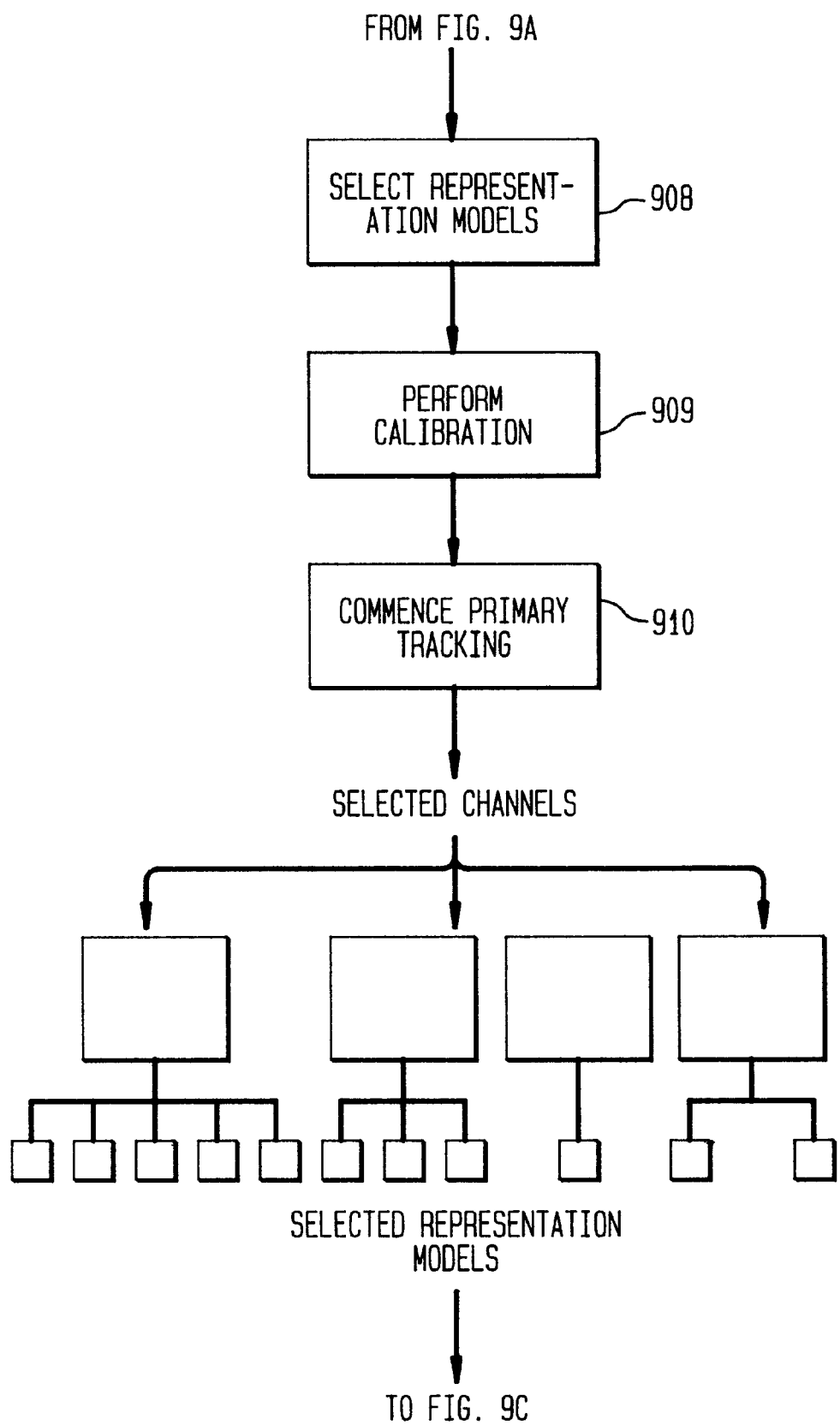
Figure 9C:
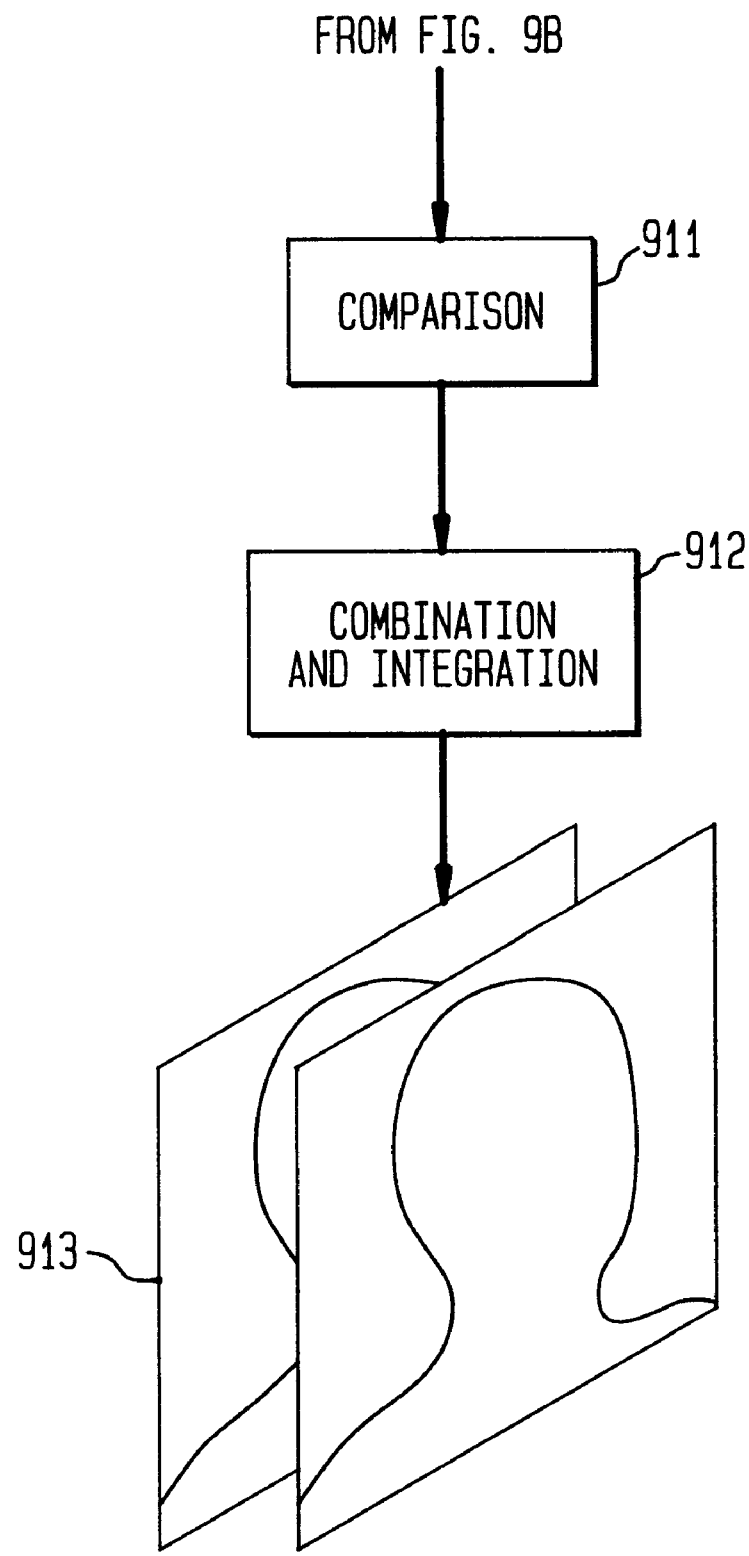

FIG. 9 illustrates a flowchart according to a preferred embodiment of the invention. The determination of an optimal tracking strategy is accomplished by conducting an initial overview analysis 904, such as in FIG. 9A. In this example, a shape channel 901, a color channel 902, a motion channel 90X, and other channels are used in an initial overview sequence 904 to determine basic parameters of the tracked images. The initial overview 904 generally involves activating the channels and gathering data during a short, predetermined sequence of frames. The representations generated by the overview process 904 are then combined and integrated (step 905), preferably using an n-gram search (along with a comparison step for correlation if complementary representations are involved). The result is an intermediate representation (or series of representations) which can then be evaluated to determine the optimal tracking strategy (step 906). For example, the intermediate representation generated by the overview process may indicate that the person has a particular complexion or hair color. The evaluation step 906 considers all recognizable and pertinent characteristics of the intermediate representation, and inputs them into a model capable of making a strategy determination. This model can perform several determinative functions, including (1) selecting various channels for use in the subsequent tracking analysis, and deactivating others (step 907); (2) selecting various representation models for use by each channel (FIG. 9B, step 908); (3) providing calibration information (step 909); and (4) approximating the number of frames to be used in the analysis.

After the most appropriate tracking strategy is determined for the application, the main tracking analysis proceeds (step 910). The selected channels gather data and generate their respective representation models as in the previous embodiments. However, the analysis is flexible, fast, efficient, robust and accurate because the parameters for the method were determined in advance. Comparison for correlation of data may then be performed (FIG. 9C, step 911), and finally, combination and integration (step 912) to produce the final tracked output, which may take the form of a visual representation (913).

Mouth Analysis

Lip-reading tracking and mouth analysis presents a unique problem to practitioners. Determining the shape of the mouth for lip reading experiments is difficult because it requires finding the lip outlines with a high degree of accuracy. Often lip edges are located within one or at most a few pixels. Further, there often exists very little contrast between the lips and the surrounding skin, which makes locating the outline of the mouth even more challenging.

Quick motion of the mouth adds to the problem. When the person to be tracked utters plosives, such as 'b' or 'p', the lip motion is so fast that mouth shapes in subsequent frames (sometimes recorded at 30 Hz) can be substantially different. Thus, the controller cannot rely on finding a similar mouth shape in the preceding frame, which further exacerbates the analysis.

The present method is advantageous for use in tracking the location and motion of the mouth. In a preferred embodiment, the process is performed as follows. After the face has been located by the methods discussed above, the expected sizes of mouth and nostrils can be reasonably estimated. With this information, the controller can adjust the parameters for the shape analysis to determine the mouth's size more precisely.

A careful calibration of the color space is necessary to discriminate between the lips and the surrounding skin. Often there is little contrast between lips and skin. In fact, the color differences may be so subtle that the mouth area may need to be segmented into four or five areas, and then combining them with a clustering algorithm to determine the shape of the lips.

To analyze the interior of the mouth in greater detail, intensity cross sections through the mouth may be analyzed. In combination with color segmentation, such profiles provide useful information about the location of the lip edges and the visibility of teeth and tongue. The shapes produced by the combinations of channels are then combined with an n-gram search.

It will be understood that the foregoing is merely illustrative of the principles of the invention, and that various modifications and variations can be made by those skilled in the art without departing from the scope and spirit of the invention. The claims appended hereto are intended to encompass all such modifications and variations.

We claim:

1. A method for tracking heads and faces, comprising the steps of:

activating a channel for collecting data comprising perceived locations of designated features of one of heads and faces;

collecting the data for each feature during a sequence of frames;

generating, for each feature, one or more representation models based on the collected data, wherein for at least one feature, complementary representation models are generated, and wherein each complementary representation model comprises data reflecting the perceived location of the feature to which it corresponds;

comparing the complementary representation models corresponding to the at least one feature to generate correlated data; and combining the correlated data into a single representation, wherein said comparing step comprises the steps of:

defining a distance metric for each of the complementary representation models corresponding to the at least one feature;

positioning the complementary representation models adjacent a common interface;

measuring the mutual overlap of the complementary representation models; and collecting, based on the overlap, information representing areas of correlation between the complementary representation models.

2. The method of claim 1, wherein said combining step comprises an n-gram search.

3. The method of claim 1, wherein the single representation is further combined with at least one representation from a second active channel.

4. The method of claim 1, wherein the complementary representation models comprise a bounding box.

5. The method of claim 4, wherein the complementary representation models further comprise a pixel map.

6. The method of claim 1, further comprising the step of:

generating, for each feature lacking corresponding complementary models, a unitary representation model based on the data collected for each such feature, wherein each unitary model comprises data reflecting the perceived location of the feature to which it corresponds;

combining the single representation with each unitary model to form a tracked output.

7. The method of claim 6, wherein said combining of the single representation with each unitary model comprises an n-gram search.

8. The method of claim 1, wherein the complementary models are predetermined pursuant to an optimal tracking strategy.

9. The method of claim 6, wherein the complementary models are predetermined pursuant to an optimal tracking strategy.

10. The method of claim 6, wherein each unitary model is predetermined pursuant to an optimal tracking strategy.

11. The method of claim 8, wherein the optimal tracking strategy is determined by representation models obtained from an initial overview sequence.

12. The method of claim 10, wherein the optimal tracking strategy is determined by representation models obtained from an initial overview sequence.

13. A method for locating heads and faces in a sequence of frames of images, comprising the steps of:

activating a plurality of channels for tracking the heads and faces;

gathering, by each channel, data from the tracked images during a sequence of frames;

generating, from data gathered by a first channel, a first group of complementary representation models comprising perceived locations of head and facial features;

comparing the first group of complementary representation models to generate a first intermediate representation comprising correlated data, and combining the correlated data into a single representation, wherein said comparing step comprises the steps of:

positioning the complementary representation models adjacent a common interface;

retrieving a comparison function from memory;

selecting, based on the identity of the representation models, one or more distances metric;

measuring the mutual overlap between the representation models; and storing the data correlating to the representation models.

14. The method of claim 13, wherein said combining step comprises an n-gram search.

15. The method of claim 13, further comprising the step of:

generating, for a second channel, a second group of complementary representation models comprising perceived locations of head and facial features to which the second group of complementary models corresponds.

16. The method of claim 15, further comprising the step of comparing the second group of complementary models to generate a second intermediate representation comprising correlated data, wherein said second intermediate representation corresponds to head and facial features represented by the second complementary group;

combining the first intermediate representation with the second intermediate representation.

17. The method of claim 16, wherein said combining of the first and second intermediate representations comprises a tracked output.

18. A method for tracking facial features in images, comprising the steps of:

activating a fast channel;

collecting a first set of complementary representation models, by the first channel, of designated candidate facial features;

determining correlated data between the first set of complementary representation models;

generating a first intermediate representation based on the correlated data;

activating a second channel;

collecting a second set of complementary representation models, by the second channel, of designated candidate facial features;

measuring the correlated data between the second set of complementary representation models;

generating a second representation based on the correlated data; and combining the first intermediate and second representations to from a tracked output.

19. The method of claim 18, wherein said determining step further comprises the steps of:

overlapping the first set of complementary representation models on a common interface;

computing the mutual overlap between the overlapping models; and gathering correlated data based upon the overlap.

20. A method for tracking facial features in complex images, comprising the steps of:

activating a plurality of channels for performing an initial overview sequence;

generating, based on data gathered from the overview sequence, one or more representations comprising facial feature candidates;

terminating activity on the plurality of channels;

determining, based on the one or more representations, an optimal tracking strategy for the images to be tracked by selecting, for one or more additional facial features, representation models which correspond to each additional feature; and reactivating selected channels of the plurality of channels for gathering data from the images to be tracked, wherein said determining step further comprises the steps of selecting, for designated facial features, complementary representation models which correspond to each designated feature, and for one or more additional facial features, unitary representation models which correspond to each additional feature; and generating a first representation from the unitary models;

comparing the complementary representation models to generate a second representation comprising correlated data; and combining the first and second representations.

21. The method of claim 20, wherein one channel of the plurality performs a shape analysis.

22. The method of claim 20, wherein another channel of the plurality performs a motion analysis.

* * * * *